United States Patent
O'Connor

(10) Patent No.: US 7,614,628 B2
(45) Date of Patent: Nov. 10, 2009

(54) CONVERTIBLE CARRYING CASE SYSTEMS AND COLLAPSIBLE WHEELED CARTS FOR CARRYING CASES

(75) Inventor: Charles S. O'Connor, Westport, CT (US)

(73) Assignee: EZM, Inc., Norwalk, CT (US)

( * ) Notice: Subject to any disclaimer, the term of this patent is extended or adjusted under 35 U.S.C. 154(b) by 532 days.

(21) Appl. No.: 11/158,265

(22) Filed: Jun. 21, 2005

(65) Prior Publication Data

US 2006/0071436 A1    Apr. 6, 2006

Related U.S. Application Data

(60) Provisional application No. 60/582,046, filed on Jun. 22, 2004.

(51) Int. Cl.
*B62B 1/04*    (2006.01)

(52) U.S. Cl. .................... 280/37; 280/654; 280/652

(58) Field of Classification Search ............ 280/645, 280/652, 654, 655, 47.17, 37
See application file for complete search history.

(56) References Cited

U.S. PATENT DOCUMENTS

| | | | |
|---|---|---|---|
| 2,812,950 A | 11/1957 | Holloway | |
| 2,932,526 A | 4/1960 | Campbell | |
| 3,197,226 A * | 7/1965 | Erlinder | 280/646 |
| 3,831,958 A | 8/1974 | Keaton | |
| 3,892,429 A * | 7/1975 | dit Dalmy | 280/654 |
| 4,128,252 A | 12/1978 | Raniero | |
| 4,294,463 A | 10/1981 | Kotani | |
| 4,426,099 A | 1/1984 | Gross | |
| 4,478,429 A * | 10/1984 | Adams | 280/655 |
| 4,506,897 A | 3/1985 | Libit | |
| 4,538,709 A | 9/1985 | Williams et al. | |
| D287,779 S | 1/1987 | Slany | |
| 4,684,141 A * | 8/1987 | Nunokawa | 280/40 |
| 4,746,141 A * | 5/1988 | Willis | 280/655 |
| 4,754,985 A * | 7/1988 | Im et al. | 280/40 |
| 4,917,392 A | 4/1990 | Ambasz | |
| 4,917,401 A * | 4/1990 | Iwaki | 280/655 |
| 4,969,660 A | 11/1990 | Spak | |
| 5,024,458 A * | 6/1991 | Kazmark et al. | 280/645 |
| 5,127,662 A | 7/1992 | Spak | |
| 5,294,145 A | 3/1994 | Cheng | |
| 5,312,006 A | 5/1994 | Lag | |
| 5,348,325 A * | 9/1994 | Abrams | 280/40 |
| 5,421,605 A | 6/1995 | Chen | |

(Continued)

*Primary Examiner*—Jeffrey J Restifo

(57) ABSTRACT

A collapsible wheeled cart for carrying cases comprises a handle, a support platform for a carrying case pivotally connected to a lower end of the handle, a pair of wheel arms each having an outer end carrying a wheel and an inner end pivotally connected to the lower end of the handle, and an actuator operable to effect movement of the platform and wheel arms in unison from a non-deployed position in a collapsed configuration for the cart to a deployed position in an expanded configuration for the cart. The actuator is operable by a user applying a single manual operative motion to the actuator, which serves to expand the depth and width of the cart when it is placed in the expanded configuration from the collapsed configuration. A convertible carrying case system includes a carrying case, a wheeled luggage cart supporting the carrying case, a connector element on the cart and a complementary connector element on the carrying case releasably lockingly engaged with the connector element on the cart allowing a non-rolling carrying case to be converted into a rolling carrying case.

8 Claims, 12 Drawing Sheets

U.S. PATENT DOCUMENTS

| | | | |
|---|---|---|---|
| 5,452,778 A | 9/1995 | Wang | |
| 5,464,244 A * | 11/1995 | Tsai | 280/655 |
| 5,468,005 A * | 11/1995 | Yang | 280/40 |
| 5,529,322 A | 6/1996 | Barton | |
| 5,549,318 A | 8/1996 | Ho | |
| D376,238 S | 12/1996 | Tsai | |
| 5,626,351 A * | 5/1997 | Tsai | 280/40 |
| 5,639,109 A * | 6/1997 | Liang | 280/655 |
| 5,641,170 A | 6/1997 | Helm | |
| 5,685,552 A | 11/1997 | Osaki | |
| 5,730,264 A * | 3/1998 | Lu | 190/108 |
| 5,749,446 A * | 5/1998 | Hsieh | 190/107 |
| 5,797,617 A | 8/1998 | Lin | |
| 5,803,471 A * | 9/1998 | DeMars et al. | 280/40 |
| 5,829,558 A * | 11/1998 | Cheng | 190/116 |
| 5,876,048 A | 3/1999 | Lee | |
| 5,951,037 A * | 9/1999 | Hsieh et al. | 280/655 |
| 5,970,579 A | 10/1999 | Lu | |
| 5,984,327 A * | 11/1999 | Hsieh et al. | 280/47.24 |
| D419,740 S | 1/2000 | Blaha et al. | |
| 6,012,729 A | 1/2000 | Lin | |
| 6,050,592 A * | 4/2000 | Kim | 280/652 |
| 6,053,514 A | 4/2000 | Su | |
| 6,070,888 A * | 6/2000 | Wang | 280/37 |
| 6,095,534 A | 8/2000 | Wong | |
| 6,102,433 A * | 8/2000 | Stevens | 280/646 |
| D448,907 S | 10/2001 | Tsai | |
| 6,425,599 B1 * | 7/2002 | Tsai | 280/652 |
| 6,439,596 B1 * | 8/2002 | Tsai | 280/639 |
| 6,447,002 B1 * | 9/2002 | Fang | 280/646 |
| D480,194 S | 9/2003 | Tsai | |
| RE38,436 E | 2/2004 | Su | |
| 6,685,214 B2 * | 2/2004 | Gregory | 280/652 |
| 6,866,290 B2 * | 3/2005 | Tsai | 280/655 |
| 6,899,346 B2 * | 5/2005 | Pfeiffer | 280/47.29 |
| 6,923,466 B2 * | 8/2005 | Tsai | 280/646 |
| 7,004,481 B1 * | 2/2006 | Stanish | 280/37 |
| 7,036,641 B2 * | 5/2006 | Russo et al. | 190/18 A |
| 7,097,183 B1 * | 8/2006 | Su | 280/47.29 |
| 7,140,635 B2 * | 11/2006 | Johnson et al. | 280/646 |
| 7,188,859 B2 * | 3/2007 | Hardin et al. | 280/652 |
| 7,252,296 B2 * | 8/2007 | Miyoshi | 280/37 |
| 7,387,306 B2 * | 6/2008 | Zimmer | 280/47.29 |
| 7,441,785 B1 * | 10/2008 | Tsai | 280/47.29 |
| 7,445,231 B1 * | 11/2008 | Tsai | 280/655 |
| 2002/0096862 A1 | 7/2002 | Fang | |
| 2002/0153707 A1 | 10/2002 | Kady | |
| 2002/0180184 A1 | 12/2002 | Chang | |
| 2002/0185844 A1* | 12/2002 | Gregory | 280/652 |
| 2003/0038008 A1* | 2/2003 | Han | 190/115 |

* cited by examiner

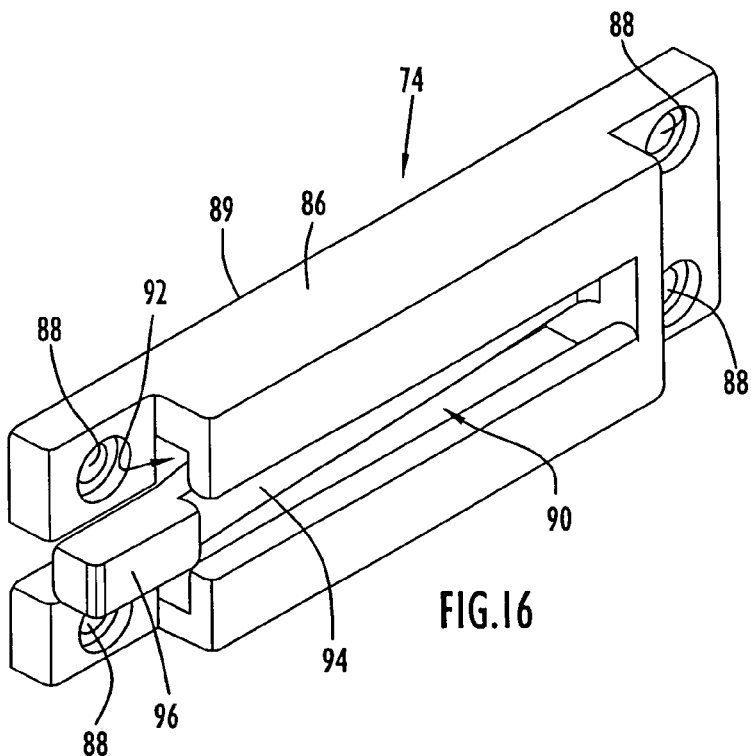
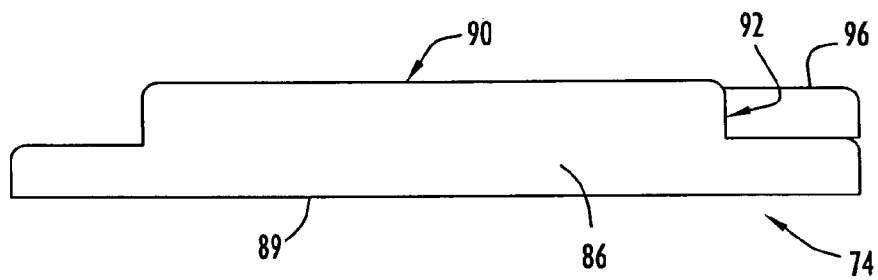
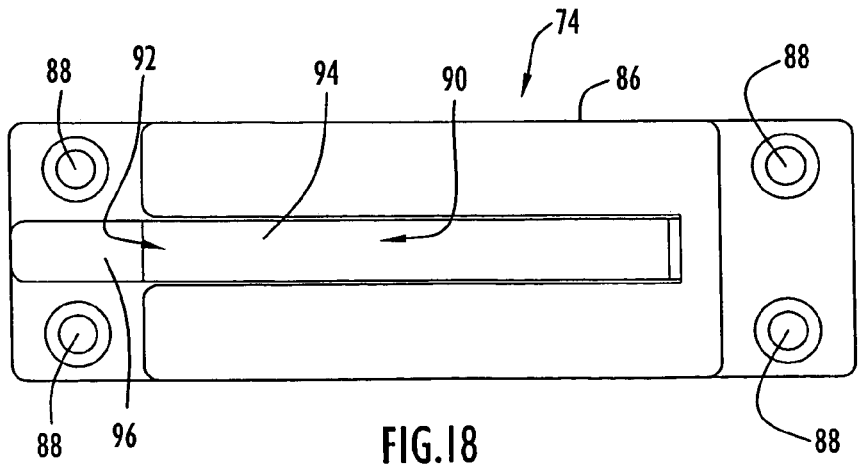

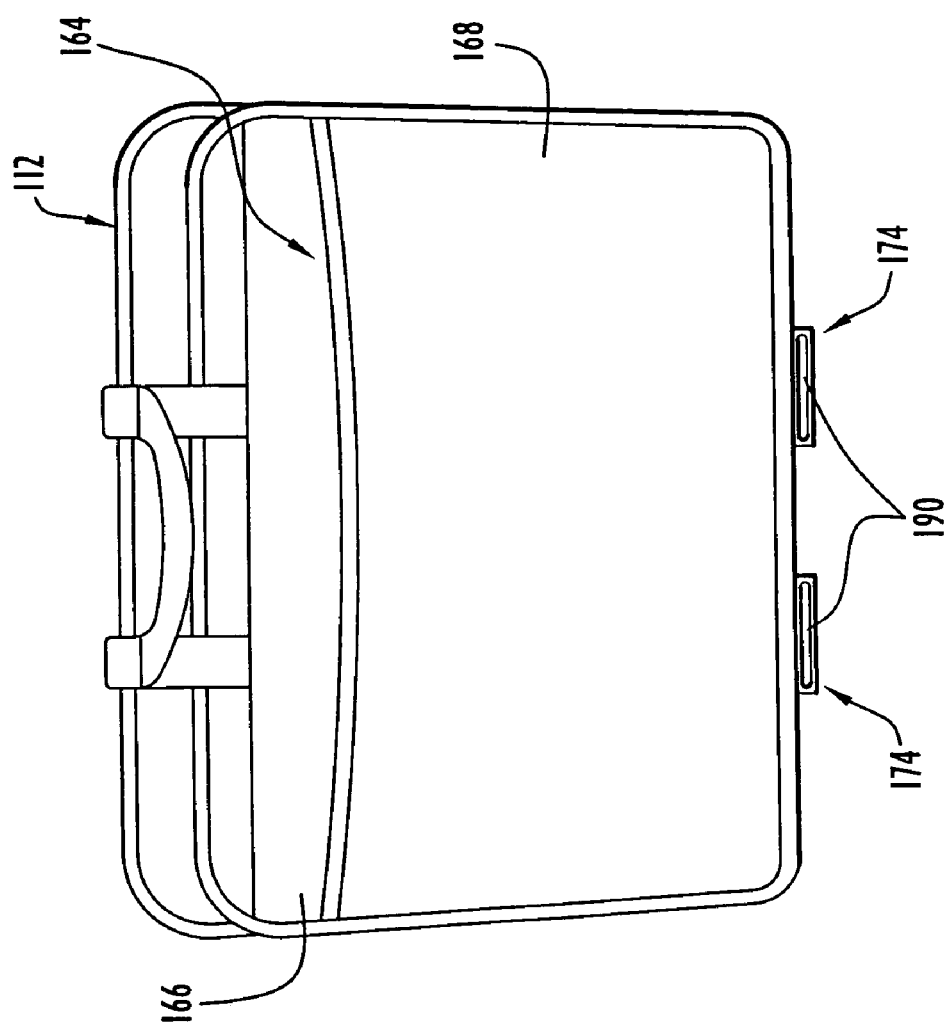

ically to a variety of external sizes providing different sizes of interior

CONVERTIBLE CARRYING CASE SYSTEMS AND COLLAPSIBLE WHEELED CARTS FOR CARRYING CASES

CROSS-REFERENCE TO RELATED PATENT APPLICATION

The subject patent application claims priority from U.S. provisional patent application Ser. No. 60/582,046 filed Jun. 22, 2004, the entire disclosure of which is incorporated herein by reference.

BACKGROUND OF THE INVENTION

1. Field of the Invention

The present invention relates generally to wheeled carts or dollies for transporting carrying cases or luggage and, more particularly, to collapsible wheeled carts for transporting carrying cases and to convertible carrying case systems having a carrying case and a removably attachable wheeled cart by which the carrying case is converted into a rolling carrying case when attached to the wheeled cart and is converted into a non-rolling carrying case when disassociated from the wheeled cart.

2. Discussion of the Related Art

Carrying cases or luggage are conventionally available in a variety of external sizes providing different sizes of interior storage space for holding contents within the carrying cases. Conventional carrying cases are commonly available in sizes ranging from very large carrying cases such as suitcases to smaller size carrying cases such as carry-on bags and briefcases. Carrying cases specifically designed to hold notebook or laptop computers are available. Some conventional carrying cases are rolling carrying cases provided with attached wheels which allow the carrying cases to be rolled along the ground, floor or other transport surface. Other conventional carrying cases are provided without attached wheels and are non-rolling carrying cases. Non-rolling carrying cases must normally be manually lifted and carried by the user in order to be transported from place to place, the lifting and/or carrying ordinarily being accomplished via a handle and/or a shoulder strap on the carrying case. The handles of non-rolling carrying cases are typically fixed handles attached to an external wall of the carrying case. In a grasping position for the handles, a hand grip of the handle is normally closely spaced from the external wall to accommodate the user's fingers between the hand grip and the external wall. Fixed handles are different from extendible and retractable handles in that the hand grips are not movable or are not movable an appreciable amount from the grasping position away from and toward the external wall. When non-rolling carrying cases are transported by lifting and carrying, the user must normally support the entire weight of the carrying case.

The need to transport non-rolling carrying cases by manual lifting and carrying can be very physically demanding where the carrying cases are relatively bulky and/or heavy and/or must be carried relatively long distances. Even where non-rolling carrying cases are not especially bulky and/or heavy and/or carried relatively long distances, the act of manually transporting such carrying cases can still be physically demanding for individuals having physical limitations. Aside from being physically demanding, manually transporting non-rolling carrying cases by lifting and carrying is oftentimes simply inconvenient for users, and the inconvenience may be compounded where the user has one or more other items to carry at the same time as the carrying case.

Rolling carrying cases are generally easier to transport from place to place than non-rolling carrying cases. Rolling carrying cases are normally provided with an extendable and retractable handle selectively movable between a retracted handle position where the hand grip of the handle is close to an external wall of the carrying case and an extended handle position where the hand grip is spaced an appreciably greater distance from the external wall of the carrying case as represented by U.S. Pat. No. 6,802,409 B1 to Tiramani et al. The extendable and retractable handles may thusly be considered adjustable in height. The distance that the hand grip is spaced from the external wall in the extended handle position is sufficient to allow the carrying case to be pulled or pushed by the user, while standing or erect, via the hand grip to roll the carrying case on its wheels along the ground, floor or other transport surface without the need for manually lifting and carrying the carrying case. In many instances, the wheels are provided along one side of the carrying case so that pushing or pulling the carrying case via its hand grip involves tipping the carrying case onto its wheels from an upright vertical orientation to elevate the opposite side of the carrying case above the transport surface. In addition to being used to effect rolling movement of the carrying case along a transport surface, the handle in the extended handle position may serve as a structural support for the carrying case and/or another object stacked on top of the carrying case and transported therewith. When the rolling function is not needed, the handle is usually moved to the retracted handle position. In most rolling carrying cases, a separate fixed handle is provided for manually lifting and carrying the carrying case when the extendable and retractable handle is in the retracted handle position. The extendable and retractable handles found on rolling carrying cases are necessarily of greater structural complexity than the fixed handles of non-rolling carrying cases.

It is to be expected that rolling carrying cases will still be manually lifted and carried some of the time in the same manner as non-rolling carrying cases. However when rolling carrying cases are to be used exclusively or primarily as non-rolling carrying cases, i.e. without utilizing the rolling function for a considerable length of time, the wheel structure, the more complex handle structure and/or any other structure associated with the rolling function constitute extraneous components which undesirably add to the weight and/or bulk of the carrying case. In addition, when rolling carrying cases are supported in an upright vertical orientation on a support surface, the attached wheels thereof may make sliding contact with the support surface. In some carrying cases the sliding contact between the wheels and the support surface makes it difficult for the carrying case to remain in the upright vertical orientation on the support surface without tipping or falling over. The wheels also present external protuberances which may get caught on and/or damage other objects. While it would be desirable to remove the wheels of rolling carrying cases when the rolling function is not needed for a considerable length of time, the wheels are typically either permanently attached to or are not quickly and easily removable from the carrying cases. Accordingly, conventional rolling carrying cases cannot be selectively converted into non-rolling carrying cases and converted back into rolling carrying cases quickly and easily on demand in accordance with user preferences and needs.

Wheeled luggage carts or dollies for transporting non-rolling carrying cases have been proposed. Generally, such luggage carts comprise a luggage support platform associated with a plurality of wheels and with a frame presenting a handle by which the cart, with a carrying case supported on the luggage support platform, can be pushed or pulled along a transport surface via the wheels. Usually the luggage support platform is designed to support the carrying case thereon in a luggage support plane so that the carrying case remains level and balanced while being rolled along the transport surface. The wheels may be mounted at or near the rear of the luggage support platform, with the wheels being spaced from one another for rotation on the transport surface in spaced apart planes perpendicular to the transport surface. The frame may extend upwardly from the luggage support platform at an angle of about 90° to the luggage support plane. By placing a non-rolling carrying case on the luggage support platform of a wheeled cart, the non-rolling carrying case can be temporarily used in a manner similar to a rolling carrying case. Unfortunately, conventional wheeled luggage carts are in general not designed to facilitate intermittent use of the carrying case as a non-rolling carrying case while the carrying case remains associated with the cart. Instead, the carrying case must normally be completely disassociated from the wheeled cart, at considerable inconvenience to the user, in order to be used as a non-rolling carrying case even for a brief time.

In order to be available for use on demand, wheeled luggage carts are oftentimes treated as an accessory to carrying cases, with users taking wheeled luggage carts on trips along with their carrying cases or luggage. To facilitate portability and/or storage of wheeled luggage carts when not being used to transport a carrying case, many wheeled luggage carts are designed to be collapsible or foldable from an open or expanded operative configuration when being used to transport a carrying case to a closed or collapsed inoperative configuration when not being used to transport a carrying case. The carts have a more compact size and configuration in the collapsed configuration than in the expanded configuration, and it is desirable for the size and configuration to be minimized as far as possible in the collapsed configuration so that the carts are easier to transport and/or store when not in active use. Nevertheless, many conventional luggage carts have a size and configuration in the collapsed configuration that is too large for the collapsed carts to be stowed in relatively small spaces such as the space beneath an airplane passenger seat and/or the space within the interior of the carrying cases themselves. Collapsible wheeled carts for transporting carrying cases or luggage are represented by U.S. Pat. No. 6,447,002 B1 to Fang, U.S. Pat. No. 6,012,729 to Lin, U.S. Pat. Nos. 5,984,327 and 5,951,037 to Hsieh et al, U.S. Pat. No. 5,803,471 to DeMars et al, U.S. Pat. No. 5,439,239 to Su, U.S. Pat. No. 5,401,043 to Myron, U.S. Pat. No. 5,348,325 to Abrams, U.S. Pat. No. 5,263,727 to Libit et al, U.S. Pat. No. 4,969,660 to Spak, U.S. Pat. No. 4,743,038 to Myers et al and U.S. Pat. No. 4,684,141 to Nunokawa et al.

Collapsible wheeled luggage carts commonly have extendible and retractable handles selectively movable between extended and retracted handle positions. The height of the handles in relation to the luggage support platform is greater in the extended handle position than in the retracted handle position so that the height of the handles is adjustable through handle extension and retraction. Extension and retraction of the handles is sometimes accomplished by virtue of hinged or pivotally connected handle sections as illustrated by the Su, Abrams and Spak patents. In other wheeled carts, extension and retraction of the handles is accomplished via slidable telescoping handle sections as illustrated by the Fang, Lin, Hsieh et al, DeMars et al, Myron, Libit et al, Myers et al and Nunokawa et al patents. Where the handles are telescoping, various mechanisms have been proposed to lock the handles in a selected handle position and to release the handles for telescoping movement to another handle position. In the Hsieh et al ('327) and DeMars et al patents, push buttons are provided for releasing the handles for telescoping movement. The handles of collapsible carts are in the extended handle position when the carts are in the expanded operative configuration and are in the retracted handle position when the carts are in the collapsed inoperative configuration. The height of the handles ordinarily extends in the same or substantially the same direction as the overall height of the luggage carts and defines at least a portion of the overall height of the luggage cart. Accordingly, the carts ordinarily are of increased overall height in the expanded operative configuration due to handle extension and are of decreased overall height in the collapsed inoperative configuration by virtue of handle retraction. The extendible and retractable handles of collapsible luggage carts thusly allow the overall height of the luggage carts to be adjusted, with the overall height being reduced in the collapsed configuration from the overall height in the expanded configuration.

In addition to being of decreased overall height in the collapsed inoperative configuration and being of increased overall height in the expanded operative configuration, most collapsible luggage carts have their overall depth decreased when placed in the collapsed inoperative configuration from the expanded operative configuration and have their overall depth increased when placed in the expanded operative configuration from the collapsed inoperative configuration. A decrease in overall depth is commonly obtained in the collapsed configuration by placing the luggage support platforms in a non-deployed position from a deployed position and, by placing the luggage support platforms in the deployed position from the non-deployed position, increased overall depth is obtained in the expanded configuration. In the deployed position, the luggage support platforms are typically disposed at an angle of about 90° to the frames. The luggage support platforms in the deployed position extend in the same or substantially the same direction as the overall depth of the luggage carts and thusly define at least a portion of the overall depth perpendicular to the overall height. In the non-deployed position, the luggage support platforms are typically placed close to the frames and extend in the same or substantially the same direction as the frames such that the carts have an overall depth in the collapsed configuration appreciably smaller than the overall depth of the carts in the expanded configuration for a slimmer, flatter profile. In many collapsible luggage carts, the luggage support platforms have a non-deployed position where the luggage support platforms lie parallel or substantially parallel to the frames.

To facilitate movement of the luggage support platforms between the deployed and non-deployed positions, collapsible luggage carts have been proposed wherein the luggage support platforms are pivotally mounted to the frames. The Fang patent is representative of a collapsible luggage cart in which the frame is pivoted relative to the luggage support platform from a position perpendicular to the luggage support platform in the deployed position to a position close to and parallel with the luggage support platform in the non-deployed position. The Lin, Hsieh et al ('327 and '037), DeMars et al, Su, Myron, Abrams, Libit et al, Spak and Myers et al patents are representative of collapsible luggage carts in which the luggage support platforms are pivoted relative to the frames from a position at an angle of about 90° to the frames in the deployed position to a position where the luggage support platforms lie parallel or substantially parallel and/or close to the frames in the non-deployed position. The Nunokawa et al patent is representative of a collapsible luggage cart where the frame must be detached from and placed alongside the luggage support platform to obtain the non-deployed position and must be reattached to the luggage support platform at a 90° angle to obtain the deployed position.

In some collapsible luggage carts, the wheels are in a deployed position when the carts are in the expanded operative configuration and are moved to a non-deployed position when the carts are placed in the collapsed inoperative configuration for greater overall depth reduction. For example, the wheels in the deployed position may protrude a considerable distance rearwardly beyond the frame and/or the luggage support platform in the direction of the overall depth, in which case the wheels define at least a portion of the overall depth. In order to minimize the impact of wheel protrusion on the size of the overall depth and obtain a flatter profile in the collapsed configuration, luggage carts of this type have been proposed in which the wheels themselves are rotated from a deployed position for the wheels in which the wheels are parallel or substantially parallel to one another in the expanded operative configuration for the luggage cart to a non-deployed position for the wheels where the wheels lie coplanar or substantially coplanar close to or in line with the frame in the collapsed configuration for the luggage cart to obtain a flatter depth profile. Collapsible luggage carts in which the wheels are moved to assume a coplanar or substantially coplanar arrangement close to the frame in a non-deployed position for the wheels are represented by the Fang, Hsieh et al ('327), DeMars et al, Su, Abrams, Libit et al and Spak patents. Notably, in the luggage carts disclosed in the Hsieh et al ('327), DeMars et al, Su, Abrams, Libit et al and Spak patents, the overall width of the carts in the collapsed inoperative configuration remains the same or substantially the same as the overall width in the expanded operative configuration despite the wheels being moved to their non-deployed position in the collapsed configurations. Accordingly, many collapsible luggage carts are designed only for an appreciable reduction in overall height and overall depth when placed in the collapsed inoperative configuration from the expanded operative configuration, with the overall width of the carts being the same or substantially the same in both the expanded and collapsed configurations. Since the overall width dimension in the expanded operative configuration is oftentimes substantial in size due to various factors including the spacing between the wheels in their deployed position, the inability to decrease the overall width when the carts are placed in the collapsed configuration limits the compactness and portability achieved for the luggage carts in the collapsed configuration.

Collapsible luggage carts which are capable of having each of their overall width, overall height and overall depth appreciably reduced in size when placed in the collapsed inoperative configuration from the expanded operative configuration are represented by the Fang, Myron, Meyers et al and Nunokawa et al patents. The Fang and Nunokawa et al patents are representative of luggage carts in which overall width reduction is accomplished by pivoting or folding side sections of the luggage support platform inwardly toward one another relative to a central section of the luggage support platform. The wheels of the carts are mounted to the side sections and move therewith. As a result of the side sections pivoting or folding inwardly toward one another, the carts have an overall width in the collapsed configuration less than that in the expanded configuration. The greater overall width of the carts in the expanded configuration is obtained by pivoting or unfolding the side sections outwardly away from one another relative to the central section so that the side sections are coplanar or substantially coplanar with the central section. The Myron patent is illustrative of a collapsible cart in which overall width reduction in the collapsed configuration is obtained by decreasing the frame width. The frame comprises legs spring biased outwardly away from one another to assume an inverted V-shaped configuration in the expanded configuration. Lower ends of the legs carry the wheels, and the legs are squeezed together to assume an essentially parallel configuration close to one another in the collapsed configuration for reduced width. In the collapsible cart disclosed by Myers et al, the frame width is reduced in a different manner than the Myron patent to obtain overall width reduction in the collapsed configuration. The frame comprises L-shaped legs disposed in a common plane and having leg segments extending outwardly in opposite directions in the direction of the overall width of the cart in the expanded configuration. The leg segments have outer ends carrying the wheels, and the leg segments are rotated about 180° inwardly toward one another for reduced overall width in the collapsed configuration.

Collapsible luggage carts that provide size reduction in three dimensions, i.e. height, depth and width, when placed in their collapsed configurations from their expanded configurations are advantageous for the greater compactness and portability afforded thereby. However, a drawback of these luggage carts and collapsible luggage carts in general relates to the operational complexity associated with placing the carts in their expanded configurations from their collapsed configurations as well as with placing the carts in their collapsed configurations from their expanded configurations.

In many collapsible luggage carts, the luggage support platforms must be placed manually in their deployed position by moving the platforms directly to obtain the proper orientation for the platforms relative to the frames in the expanded configuration. Direct manual engagement of the luggage support platforms in order to place the luggage support platforms in their deployed position requires physical exertion and the awkward use of two hands by the user such that the luggage carts cannot be opened or expanded quickly and easily on demand. Although luggage carts have been proposed in which a single manual operative motion effects two operational functions simultaneously, the operational functions accomplished with the single manual operative motion obtain only the increased depth for the carts in the expanded configuration. For example, in the luggage carts represented by the Hsieh et al ('327), DeMars et al, Abrams and Spak patents, direct manual pivotal movement of the luggage support platform from its non-deployed position to its deployed position also causes the wheels to be moved from their non-deployed position to their deployed position but achieves only the increased depth in the expanded configuration. Collapsible luggage carts in which both the depth and width must be increased to place the carts in the expanded operative configuration from the collapsed inoperative configuration, as represented by the Fang, Myron, Myers et al and Nunokawa et al patents, require a plurality of separate, different, independent and distinct manual operative motions to obtain the increased depth and width when the carts are placed in the expanded configuration from the collapsed configuration. The operational complexity associated with placing the carts in the expanded configuration is compounded where a plurality of separate, different, independent and distinct manual operative motions are required. Furthermore, the physical exertion, inconvenience and increased time required to place the carts in their expanded configuration from their collapsed configuration are also compounded when a plurality of separate, different, independent and distinct manual operative motions are required. Accordingly, there is an unfulfilled need for collapsible wheeled luggage carts in which the operational functions needed to deploy the luggage support platforms and the wheels to obtain increased depth and width when placing the carts in the expanded configuration from the collapsed configuration can be effected quickly and easily with minimal effort and inconvenience using a single, simple manual operative motion. There is also an unfulfilled need for collapsible wheeled luggage carts capable of being placed in their collapsed configuration from their expanded configuration by reversing the single, simple manual operative motion used to place the carts in the expanded configuration from the collapsed configuration.

Another disadvantage of conventional luggage carts relates to the manner in which a carrying case is maintained on the luggage cart. Where a carrying case is merely supported on the luggage support platform without being structurally or mechanically secured to the luggage cart in any way, the carrying case is at risk of falling off the luggage cart accidentally. This risk can be reduced where the width and depth of the luggage support platform are greater than or close in size to the width and depth of the carrying case for better support and stability, but a smaller size platform width and depth would be preferable in order to minimize the weight, bulk, size and cost of the luggage cart. A luggage cart in which the luggage support platform has a width and depth appropriate to support a particular size carrying case may be larger than necessary to support smaller size carrying cases and/or smaller than necessary to support larger size carrying cases, thereby limiting the types and sizes of carrying cases that can be used interchangeably with the luggage cart. Many luggage carts are used with straps or cords to secure a carrying case in position on the luggage cart. The need for users to apply straps or cords is inconvenient, tedious and time consuming, and the attachment provided by straps or cords may prove to be unreliable. It has also been proposed to removably attach a carrying case to a luggage cart by releasably engaging a connector element on the carrying case with a corresponding connector element on the luggage cart as represented by U.S. Pat. No. 5,749,446 to Hsieh and U.S. Pat. No. 5,024,455 to Schrecongost and by the Lin, Hsieh et al ('037) and Myers patents. The connector elements can be difficult to properly align for interengagement, and engagement and/or release of the connector elements is also made more difficult by their structural and/or operational complexity. The need exists, therefore, for improvements relating to the releasable attachment of carrying cases to luggage carts which are more simple and user friendly while establishing a reliable structural attachment between the carrying cases and the luggage carts.

Where conventional luggage carts are designed for structural or mechanical attachment to a carrying case, the luggage carts and attached carrying cases tend to be lacking in structural continuity and integration in that the luggage carts still appear structurally separate from and not structurally integrated with the attached carrying cases in an aesthetically appealing manner. It would be preferable from an aesthetic standpoint for the luggage carts and attached carrying cases to convey the visual appearance of structural unity and integration similar to rolling carrying cases with built-in extendable and retractable handles and built-in wheels. Luggage carts which attach to carrying cases oftentimes have physical dimensions which do not correspond proportionally to the attached carrying cases, thereby exacerbating the lack of structural continuity and integration. In addition, carrying cases that structurally attach to luggage carts are generally not suitable for being manually lifted and carried while remaining attached to the associated luggage cart and are therefore not suitable for use in a manner similar to non-rolling carrying cases unless the carrying case is completely disassociated from the cart. For greater versatility and ease of use, it would be preferable to facilitate manual transport of a carrying case by lifting and carrying while the carrying case is structurally attached to a luggage cart. In this manner, the carrying case can remain attached to the luggage cart when the rolling function is not being used without the luggage cart interfering with use of the carrying case in the manner of a non-rolling carrying case, and it would be beneficial for the carrying case to be convertible into a rolling carrying case simply by extending the handle of the attached luggage cart.

SUMMARY OF THE INVENTION

The present invention is generally characterized in a collapsible wheeled cart for transporting a carrying case and comprises a selectively extendable and retractable handle associated with a support platform for a carrying case and with a plurality of wheels for supporting the platform for rolling movement along a transport surface such as the ground or floor. The handle extends longitudinally in a direction corresponding to a height of the cart and has a lower end, an upper end and a hand grip at the upper end for being pushed or pulled by a user to roll the platform along the transport surface via the associated wheels. The platform is pivotally connected to the lower end of the handle for pivotal movement in a direction corresponding to a depth of the cart. The platform is pivotal in the direction of the depth from a non-deployed position wherein the platform extends along the height of the cart to a deployed position wherein the platform extends along the depth of the cart to support a carrying case thereon. The wheels are respectively mounted on the outer ends of a pair of wheel arms-each having an inner end pivotally connected to the lower end of the handle for pivotal movement in a direction corresponding to a width of the cart. The wheel arms are pivotal in the direction of the width from a non-deployed position wherein the wheel arms extend along the height of the cart to a deployed position wherein the wheel arms extend in opposite directions along the width of the cart to deploy the wheels for rolling movement on the transport surface. The cart includes an actuator movable longitudinally along the handle from an upper longitudinal position to a lower longitudinal position to pivot the platform and wheel arms in unison from the non-deployed position to the deployed position.

The present invention is also generally characterized in a collapsible wheeled cart for transporting a carrying case, the cart comprising a handle, a support platform pivotally mounted to a lower end of the handle, a pair of wheel arms each having an outer end carrying a wheel and an inner end pivotally mounted to the lower end of the handle, and a movable actuator pivotally connected with the platform and the wheel arms for being moved by a user applying a single manual operative motion to the actuator to pivot the platform and wheel arms in unison relative to the handle. The handle has a central longitudinal axis and a hand grip at an upper end of the handle. The handle is selectively extendable and retractable longitudinally. The platform is pivotally mounted to the lower end of the handle for pivotal movement relative to the handle about a platform pivot axis perpendicular to the central longitudinal axis of the handle. The platform has a non-deployed position wherein the platform is pivoted about the platform pivot axis toward the handle to be disposed parallel or substantially parallel to the central longitudinal axis and has a deployed position wherein the platform is pivoted about the platform pivot axis away from the handle to extend in a direction perpendicular or substantially perpendicular to the central longitudinal axis to support a carrying case thereon. The inner ends of the wheel arms are pivotally mounted to the lower end of the handle on opposite sides of the central longitudinal axis for pivotal movement relative to the handle about respective wheel arm pivot axes perpendicular to the platform pivot axis and to the central longitudinal axis of the handle. The wheel arms have a non-deployed position wherein the wheel arms are pivoted about the respective wheel arm pivot axes toward the handle to be disposed parallel or substantially parallel to the central longitudinal axis. The wheel arms have a deployed position wherein the wheel arms are pivoted in opposition to one another about the respective wheel arm pivot axes to extend in opposition away from the handle in a direction perpendicular or substantially perpendicular to the central longitudinal axis and to the direction that the platform extends in its deployed position. When the wheel arms are in their deployed position, the wheels are deployed to support the platform for rolling movement on a transport surface. The actuator is moved in response to the application of the single manual operative motion by the user to effect pivotal movement of the platform and the wheel arms in unison relative to the handle from the non-deployed positions to the deployed positions.

A further characterization of the present invention is a convertible carrying case system comprising a carrying case, a wheeled cart having a platform for supporting the carrying case thereon, a connector element on the wheeled cart and a connector element on the carrying case for releasably lockingly engaging the connector element on the cart. The carrying case can be a non-rolling carrying case which is converted into a rolling carrying case when attached to the wheeled cart and is converted back into a non-rolling carrying case when disassociated from the wheeled cart. However, the carrying case can be used as a non-rolling carrying case even while attached to the cart. The carrying case includes a plurality of external walls enclosing an interior, with the connecting element of the carrying case being disposed on one of the external walls. The wheeled cart comprises a frame having a central longitudinal axis and a handle, a support platform extending outwardly in a forward direction from a lower end of the frame at an angle to the central longitudinal axis to support the carrying case thereon, a pair of wheels on opposite sides of the central longitudinal axis deployed for rolling the platform along a transport surface when the cart is pushed or pulled via the handle, and the connector element on the cart located to releasably lockingly engage the connector element on the carrying case when the carrying case is supported on the platform. One of the connector elements comprises a connector body formed with a male locking member, and the other of the connector elements comprises a connector body formed with a female cavity for mating engagement with the male locking member. The female cavity has a closed side and an open side defining an opening for insertion of the male locking member in and removal of the male locking member from the cavity. The back of the female cavity is bounded by a deflectable finger having an attached end at the closed side of the cavity, the finger extending angularly toward the front of the cavity from the closed side toward the open side with a resilient bias to an unattached end of the finger disposed externally of the cavity at the open side thereof in obstructing relation in a non-deflected position for the finger. The finger is deflectable toward the back of the cavity from the non-deflected position to a deflected position in which the unattached end of the finger clears the open side of the cavity for insertion of the locking member in the cavity. Upon insertion of the locking member in the cavity and removal of the deflection force on the finger, the resilient bias moves the finger toward the non-deflected position causing the finger to exert a locking force on the locking member and to obstruct the open side of the cavity to prevent removal of the locking member therefrom in a locking position for the finger. The finger is deflectable from the locking position to the deflected position to release the locking member for removal from the cavity. The connector element on the carrying case may be in releasable locking engagement with the connector element on the cart with a portion of the frame extending through an external pocket on the external wall of the carrying case.

BRIEF DESCRIPTION OF THE DRAWINGS

FIG. 16 is a front perspective view of a complementary connector element for the carrying case of the convertible carrying case system.

FIG. 17 is a side view of the complementary connector element of FIG. 16.

FIG. 18 is a front view of the complementary connector element of FIG. 16.

FIG. 20 is a back view of an alternative carrying case for use with a luggage cart having the luggage support platform of FIG. 19 in an alternative convertible carrying case system according to the present invention.

DESCRIPTION OF THE PREFERRED EMBODIMENTS

Figure 2:
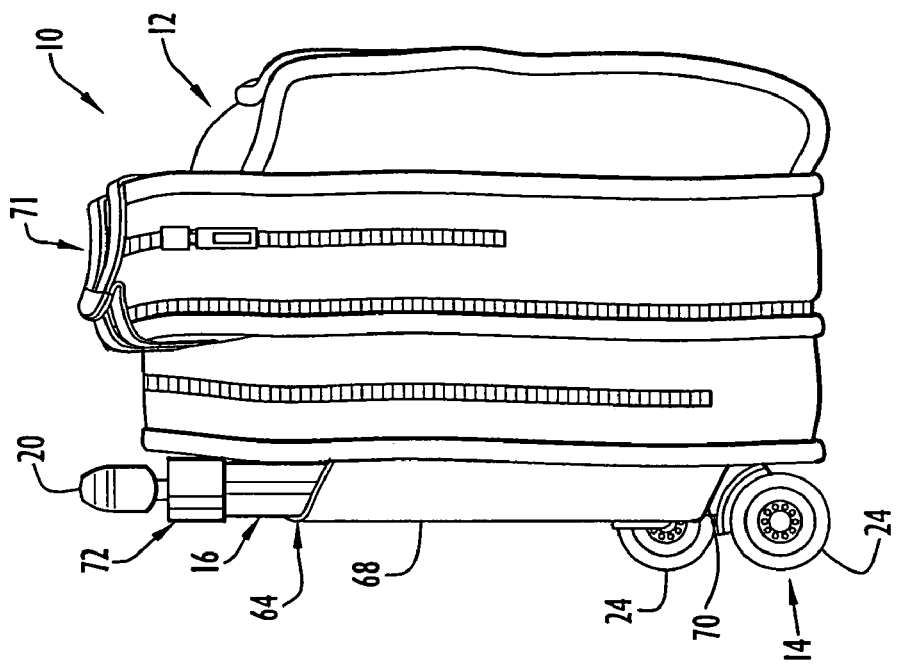
FIG. 2 is a side view of the convertible carrying case system of FIG. 1.
Figure 1:
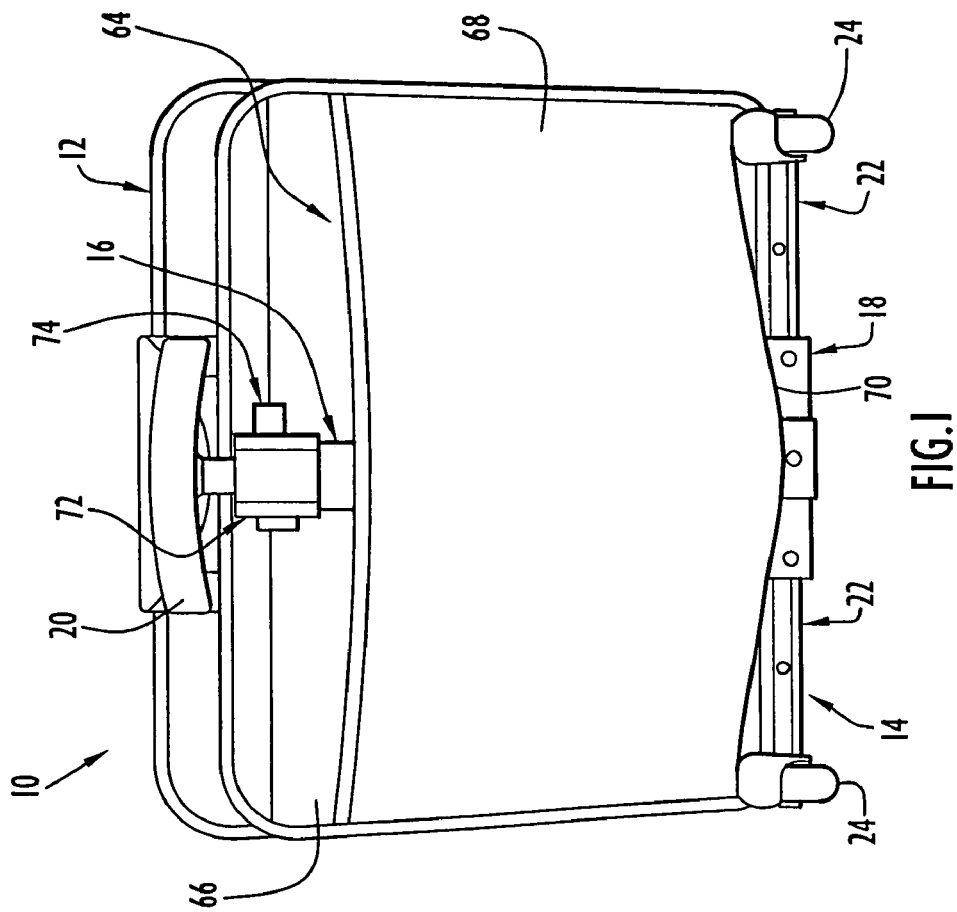
FIG. 1 is a back view of a convertible carrying case system according to the present invention comprising a carrying case and a wheeled luggage cart removably attached to the carrying case.

A convertible carrying case system 10 according to the present invention is depicted in FIGS. 1 and 2. The convertible carrying case system 10 comprises a carrying case or luggage 12 and a wheeled luggage cart or dolly 14 for transporting the carrying case 12. The carrying case 12 has a pocket for accommodating a handle or frame of the luggage cart 14 and has a connector element complementary to a connector element of the luggage cart for removable or releasable attachment of the carrying case to the luggage cart as explained further below.

Figure 3:
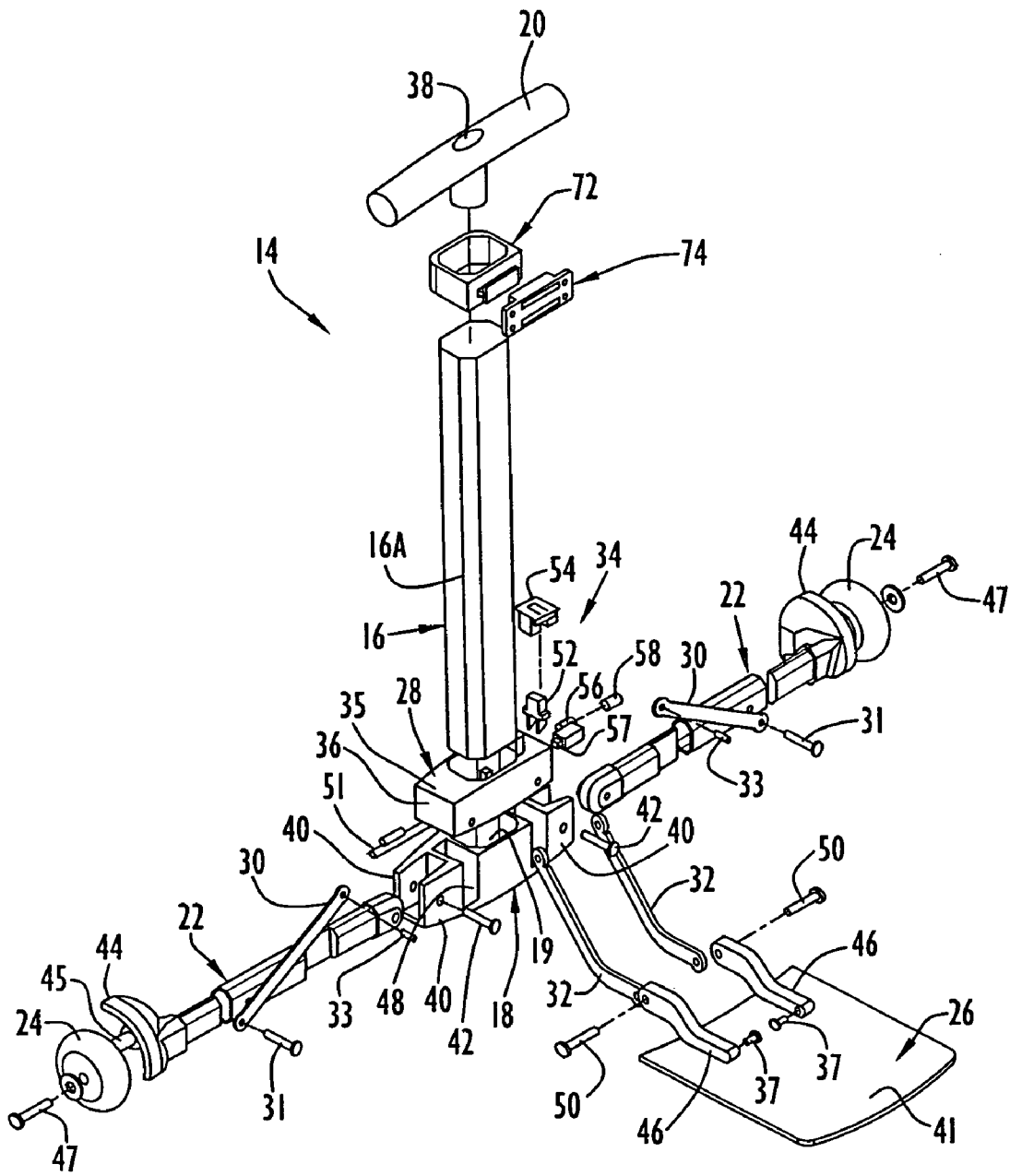
FIG. 3 is an exploded front perspective view of a collapsible wheeled luggage cart according to the present invention, which is illustrated as the luggage cart of the convertible carrying case system depicted in FIGS. 1 and 2.
Figure 10:
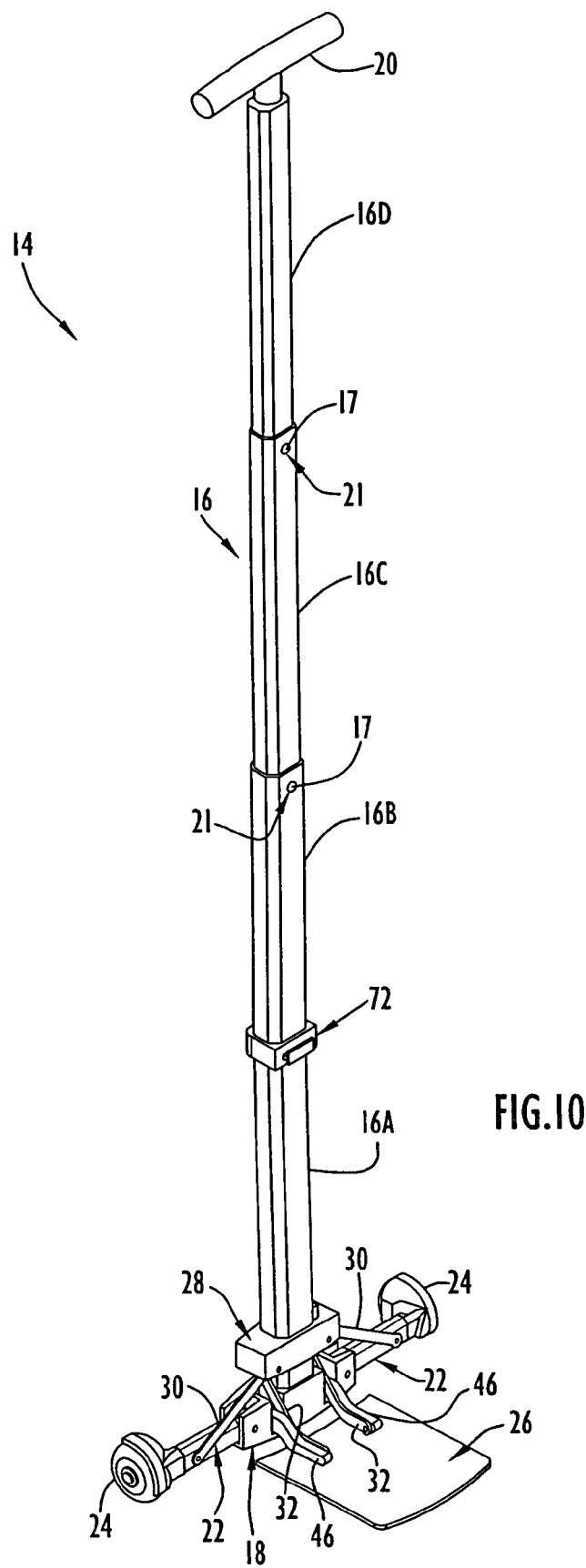
FIG. 10 is a front perspective view of the collapsible wheeled luggage cart of FIG. 4 with the handle of the luggage cart in an extended handle position.
Figure 12:
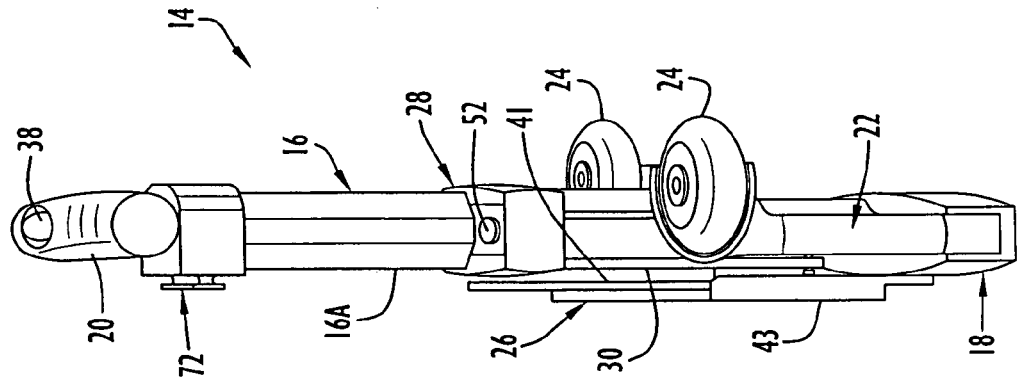
FIG. 12 is a side view of the collapsible wheeled luggage cart of FIG. 4 in the collapsed configuration.
Figure 11:
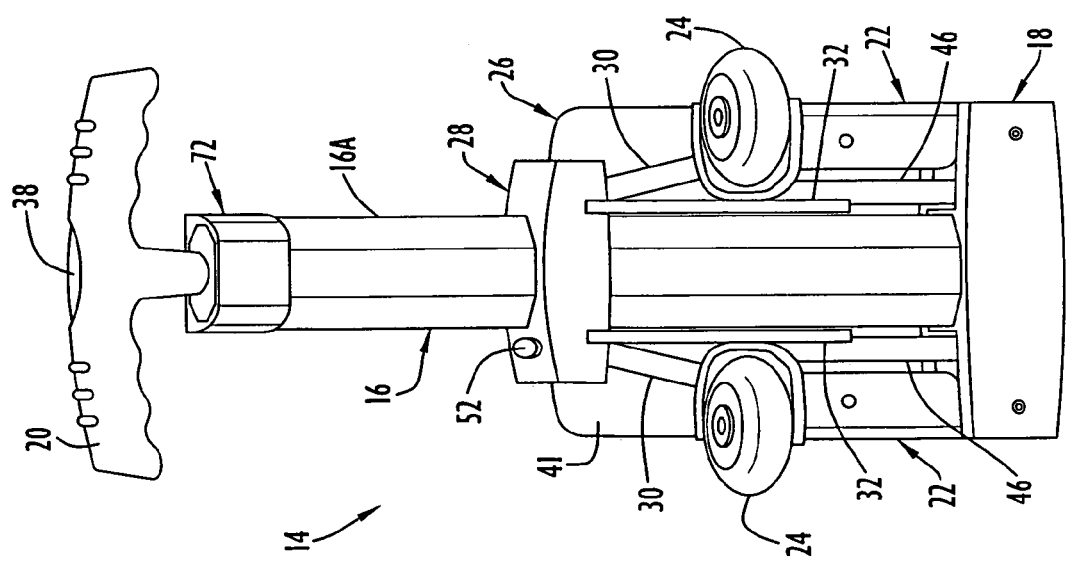
FIG. 11 is a back view of the collapsible wheeled luggage cart of FIG. 4 in a closed or collapsed configuration.

The luggage cart 14 comprises a collapsible wheeled luggage cart for transporting a carrying case or luggage and is best shown in FIGS. 3-12. The luggage cart 14 comprises a telescoping handle 16 having a central longitudinal axis, a lower end connected to a base 18 and an upper end terminating in a generally T-shaped hand grip 20, a pair of wheel or roller arms 22 having inner ends pivotally connected to the base 18 and outer ends carrying wheels or rollers 24, a luggage support platform or carrier 26 pivotally connected to the base 18, an actuator or slider 28 mounted for longitudinal movement along the handle 16, wheel or roller struts 30 pivotally connecting the wheel arms 22 to slider 28, platform struts 32 pivotally connecting the platform 26 to the slider 28, a locking and releasing mechanism 34 for locking the slider 28 against and releasing the slider 28 for longitudinal movement along the handle 16 to obtain an open or expanded configuration and a closed or collapsed configuration for the luggage cart 14, and a pair of platform arms 46 having rearward ends pivotally connected to base 18 and forward ends connected to platform 26 and to the platform struts 32. FIG. 3 depicts the luggage cart 14 in an unassembled condition, the luggage cart 14 being depicted in an assembled condition in FIGS. 1, 2 and 4-12. FIGS. 1, 2 and 4-10 depict the luggage cart 14 in the expanded configuration, but with the handle 16 in a longitudinally retracted handle position in FIGS. 1, 2 and 4-9 and in a longitudinally extended handle position in FIG. 10. FIGS. 11 and 12 illustrate the luggage cart 14 in the collapsed configuration with the handle 16 in the longitudinally retracted handle position.

As best seen in FIG. 10, the handle 16 comprises a plurality of hollow or tubular handle sections 16A, 16B, 16C and 16D interfitted coaxially in sequential nesting arrangement for slidable telescoping movement between the longitudinally retracted handle position shown in FIGS. 1, 2, 4-9, 11 and 12 and the longitudinally extended handle position depicted in FIG. 10. The handle sections preferably have a non-circular configuration in cross-section to resist rotation of the handle sections relative to one another while permitting the handle sections to slide relative to one another in a telescoping manner. The lowermost handle section 16A extends through a passage in the slider 28 to base 18 for securement of a lower end of handle section 16A to base 18. The handle 16 and base 18 may be considered as forming a frame or body of the luggage cart 14 to which the wheels 24 and luggage support platform 26 are mounted via wheel arms 22 and platform arms 46. The wheels 24 and platform 26 can be considered mounted to the lower end of the handle 16 by base 18. The base 18 can be considered part of the lower end of handle 16 and/or the frame. The handle section 16A has the largest cross-section, with handle sections 16B, 16C and 16D being of progressively smaller cross-section to fit consecutively inside each other with a close fit. Handle section 16B slides within handle section 16A, handle section 16C slides within handle section 16B and handle section 16D slides within handle section 16C. A central stem of hand grip 20 is disposed in an upper end of handle section 16D such that the cross-piece of the hand grip 20 extends transverse or perpendicular to the central longitudinal axis of the handle, and the central stem of hand grip 20 could slide within handle section 16D. It should be appreciated that the handle 16 can comprise any number of handle sections of the same length or of different lengths.

A handle operating member 38, such as a push button shown in FIGS. 3, 4, 11 and 12 on the transverse cross-piece of hand grip 20, is operated to unlock or release the handle 16 for telescoping movement from the retracted handle position to the extended handle position. The operating member 38 is operated by being depressed by the user, allowing the handle 16 to be moved from the retracted handle position to the extended handle position by the user pulling upwardly on the cross-piece of the hand grip 20, with the handle 16 thereafter being locked in the extended handle position. Preferably, the handle 16 in a fully extended handle position is extended to about thirty-eight inches so that the cross-piece of hand grip 20 is located for being conveniently grasped by a user, while standing or erect, to push or pull the cart as explained further below. To return the handle 16 to the retracted handle position, the handle operating member 38 is operated by being depressed by the user, which releases the handle 16 for telescoping movement from the extended handle position to the retracted handle position by the user pushing down on the cross-piece of hand grip 20, and the handle 16 is thereafter locked in the retracted handle position. Extension and retraction of the handle 16 thusly requires the use of only one hand in that the operating member 38 may be operated and the hand grip 20 pushed or pulled using the same hand to effect telescoping movement of the handle sections. The transverse cross-piece of the hand grip 20 may be curved as shown in FIGS. 1, 2 and 10-12 or straight as shown in FIGS. 3-9. The cross-piece may be provided with ridges or indentations to facilitate grasping.

It should be appreciated that the extended handle position may be a fully or maximally extended handle position and that the handle can have one or more partially or intermediate extended handle positions between the fully extended handle position and the retracted handle position in accordance with the number of and/or the extension distance for the handle sections that are extended from handle section 16A. In this way, the height of the handle in the extended handle position can be selected by the user to optimally position the cross-piece of hand grip 20 to be grasped by a hand of the user with maximum ease and comfort in accordance with the user's stature and arm length. Various handle locking mechanisms may be operatively associated with the operating member 38 and incorporated in the handle 16 to releasably lock the handle sections in the retracted handle position and in any selected extended handle position. A locking mechanism shown by way of example in FIG. 10 comprises a detent 17 on each inner sliding handle section spring biased into a hole 21 in the next outer receiving handle section to lock the inner sliding handle section and next outer receiving handle section against telescoping or sliding movement relative to one another, with the detent 17 being removed from the hole 21 in response to operation of operating member 38 to permit telescoping movement between the inner and next outer handle sections. By virtue of the detents 17 being spring biased, the detents are able to spring outwardly into the holes 21 upon becoming aligned with the holes 21 and/or upon release of the operating member 38. Although the handle operating member 38 is shown as a push button, any suitable operating member at any suitable location on the luggage cart 14 may be used to effect telescoping movement of the handle 16. The disclosures of U.S. Pat. No. 6,802,409 B1 to Tiramani et al, U.S. Pat. No. 5,984,327 to Hsieh et al and U.S. Pat. No. 5,803,471 to DeMars et al are incorporated herein by reference for operating members and locking mechanisms which may be used in the luggage cart 14 in conjunction with handle 16.

By virtue of handle extension and retraction, the handle 16 is adjustable longitudinally in length along its central longitudinal axis. Since the central longitudinal axis of handle 16 extends in the direction of the height dimension of the luggage cart 14, the luggage cart 14 is adjustable in height by virtue of handle extension and retraction. The luggage cart 14 will be of greater height when the handle is in an extended handle position and will be of lesser height when the handle is in the retracted handle position. The handle 16 is retractable and extendable while the cart 14 is otherwise in the expanded configuration as seen from FIGS. 4 and 10. When the luggage cart 14 is in the expanded configuration with the handle 16 maximally or fully extended, the luggage cart may be considered as being in a fully or maximally expanded configuration wherein the luggage cart is of maximum obtainable height. When the luggage cart 14 is in the expanded configuration with the handle 16 extended less than the maximum or full amount, the luggage cart may be considered as being in a partially expanded configuration wherein the luggage cart is of less than the maximum obtainable height. The luggage cart 14 may also be considered as being in a partially expanded configuration where the luggage cart is otherwise in the expanded configuration but the handle 16 is fully retracted. As used herein, "expanded configuration" is thusly intended to encompass the fully expanded configuration and any partially expanded configurations for the luggage cart.

The base 18 has a central longitudinal axis extending along the width dimension of the luggage cart 14 perpendicular to the central longitudinal axis of handle 16 extending along the height dimension of the luggage cart. The base 18 comprises a central section and opposing end or side sections located on opposite sides of the central section along the central longitudinal axis of the base. A cavity 19 is formed in the central section and is bounded by a front wall, a back wall, a bottom wall and a pair of interior side walls of base 18 extending between the front and back walls. The cavity 19 is open along the top of base 18 to receive the lower end of handle section 16A. The cavity 19 preferably has a cross-section to receive the external cross-section of the handle section 16A with a close fit, the lower end of handle section 16A being secured in the cavity 19. Each end section of base 18 is configured with a pair of upstanding spaced apart walls 40 extending laterally outwardly of the central section along the front and back of base 18, respectively, to terminate at edges defining an outer end or side of base 18. The end sections extend laterally outwardly of the central section in opposite directions along the width of the luggage cart. A wheel arm compartment is defined between each pair of walls 40 for pivotally mounting an inner end of a corresponding wheel arm 22. Each wheel arm compartment is bounded by its walls 40 along the front and back of base 18, by the bottom wall of base 18 and by a partition wall of base 18 spaced from the corresponding interior side wall of base 18. Each wheel arm compartment is open along the top of base 18 and along the corresponding outer end or side of base 18 to accommodate pivotal movement of the corresponding wheel arm 22 as explained further below. Platform arm compartments 48 are defined in base 18 on each side of the cavity 19 for pivotally mounting rearward ends of the platform arms 46. Each platform arm compartment 48 is disposed between cavity 19 and the corresponding wheel arm compartment and is thusly defined between the corresponding interior side wall and partition wall of base 18. The platform arm compartments 48 are open along the top and front of base 18 to accommodate pivotal movement of the corresponding platform arms 46 as explained further below.

The inner end of each wheel arm 22 is pivotally mounted in the corresponding wheel arm compartment, and the pivotal mounting may be accomplished via pivot structure 42 such as a rivet, pin or other pivot structure extending through aligned holes in the walls 40 and the inner end of the wheel arm 22. The central longitudinal axes of the pivot structures 42 are parallel to one another, are perpendicular to the longitudinal axis of handle 16 and are perpendicular to the longitudinal axis of base 18. The inner ends of the wheel arms 22 are thereby pivotally mounted to the base 18 for rotation or pivotal movement of the wheel arms 22 relative to the handle 16 about the central longitudinal axes of the pivot structures 42, which define parallel wheel arm pivot axes perpendicular to the longitudinal axes of handle 16 and base 18. The wheels 24 are rotatably mounted to the outer ends of the wheel arms 22, which may be respectively associated with wheel or roller housings 44 having wheel axles 45, one of which is seen in FIG. 3, on which the wheels 24 are rotatably mounted. The wheel housings 44 may be curved or otherwise configured to shield the upper/forward portions of the wheels 24. The wheel axles 45 may be tubular to receive the ends of attachment elements 47, such as pins which pass centrally through the wheels 24 and into the wheel axles 45, to secure the wheels 24 for rotation on the wheel axles 45. The central longitudinal axes of the wheel axles 45 define wheel rotation axes about which the wheels 24 rotate.

Figure 6:
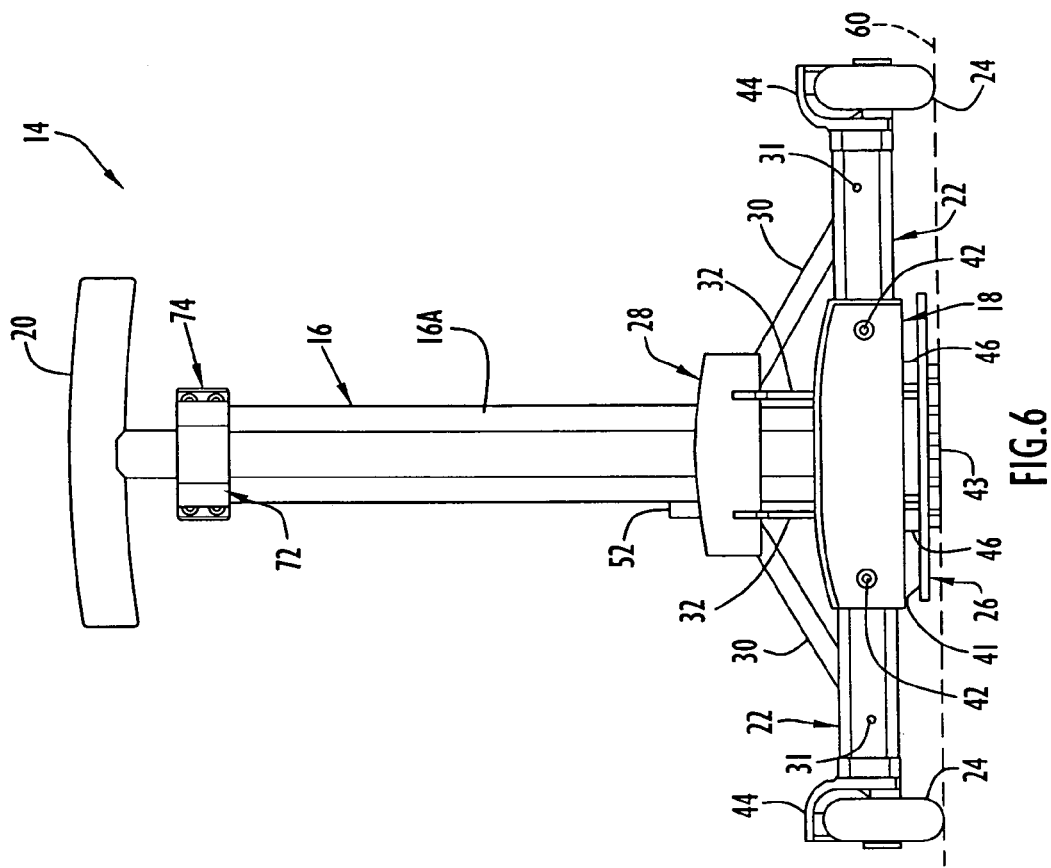
FIG. 6 is a back view of the collapsible wheeled luggage cart of FIG. 4.
Figure 5:
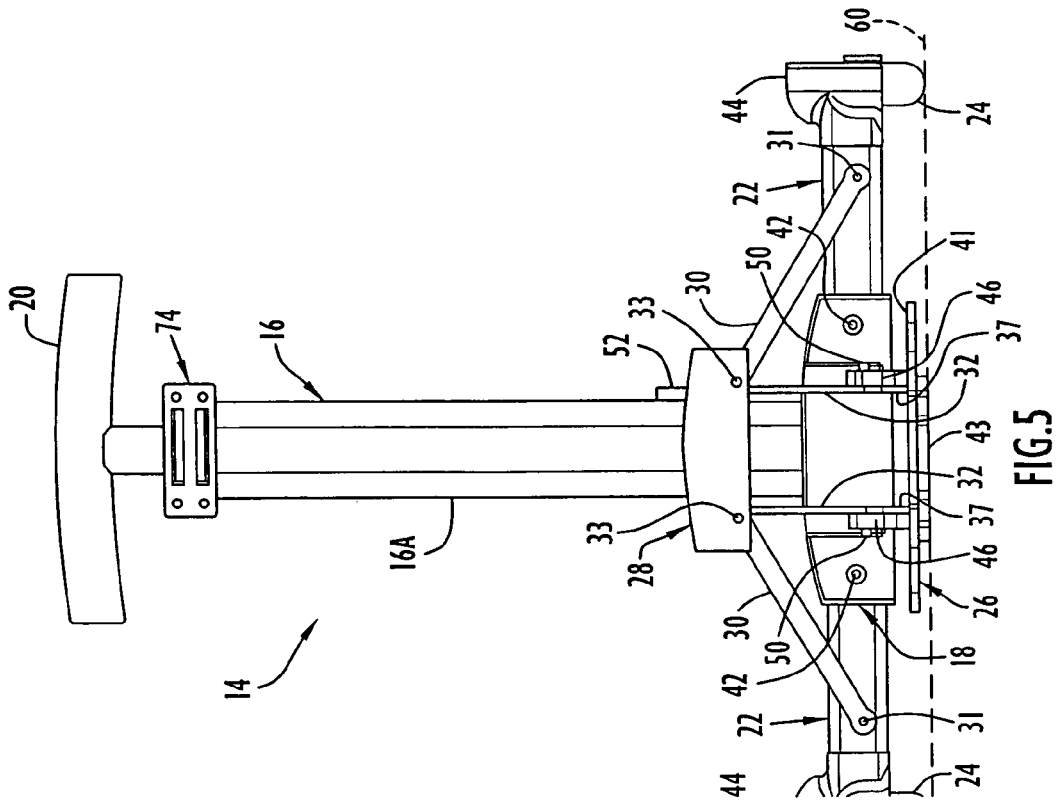
FIG. 5 is a front view of the collapsible wheeled luggage cart of FIG. 4.
Figure 7:
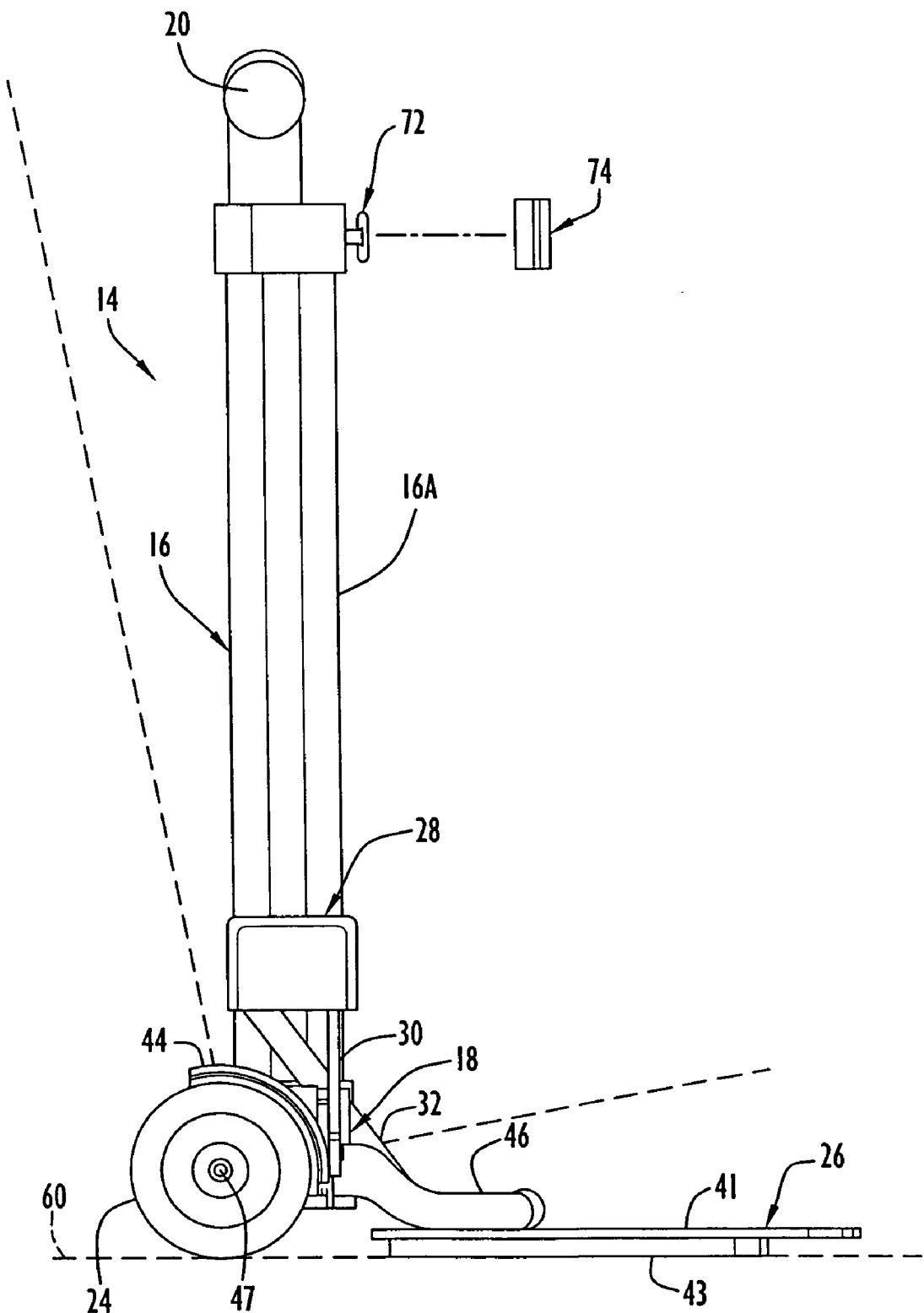
FIG. 7 is a side view of the collapsible wheeled luggage cart of FIG. 4.
Figure 9:
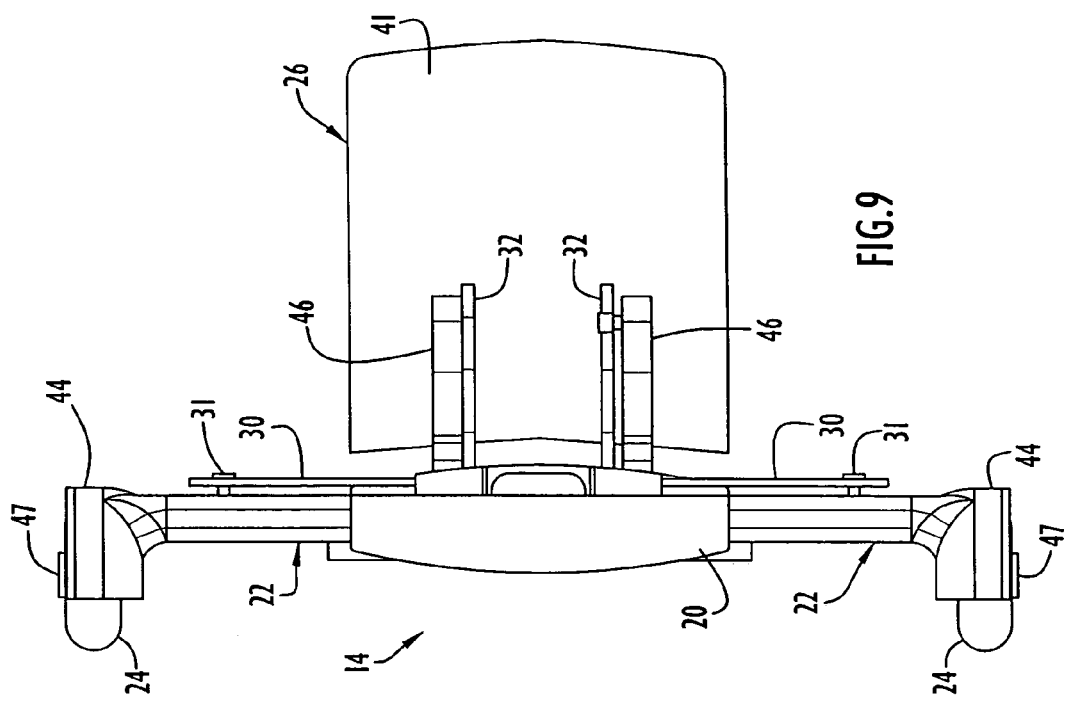
FIG. 9 is a top view of the collapsible wheeled luggage cart of FIG. 4.

When the luggage cart 14 is in the open or expanded operative configuration, the wheel arms 22 extend in opposite lateral directions from base 18 perpendicular or substantially perpendicular to handle 16. In this position, the wheel arms 22 in the extended position extend along the width of the luggage cart 14, with the central longitudinal axes of the wheel arms 22 coaxial or substantially coaxial along a wheel arm extension axis that is perpendicular to the wheel arm pivot axes and to the central longitudinal axis of the handle 16. The wheel rotation axes defined by the central longitudinal axes of wheel axles 45 may be spaced a sufficient but small distance rearwardly of the wheel arm extension axis such that the wheels 24 do not protrude forwardly of base 18. This allows a carrying case to be placed on the platform 26, which extends forwardly of the base 18 in the expanded configuration, as close as possible to base 18 and handle 16. In addition, the wheel housings 44 prevent a carrying case on platform 26 from interfering with unrestricted rotation of the wheels 24. When the wheel arms 22 are extended perpendicular or substantially perpendicular to the handle 16 in the expanded configuration, the wheels 24 are in a deployed position for rolling contact with a transport surface 60 while the wheel arms 22 remain elevated above the transport surface 60 as shown in FIGS. 5-7. The wheels 24 in the deployed position are maximally spaced from the central longitudinal axis of handle 16 in the direction of the width of the luggage cart and are rotatable in parallel or substantially parallel planes perpendicular or substantially perpendicular to the wheel arm extension axis and to the transport surface 60. Although one wheel 24 is provided at the outer end of each wheel arm 22, it should be appreciated that more than one wheel can be provided on each wheel arm at any suitable locations.

The handle 16 is generally columnar in configuration with a narrow or minimal width and depth. The central section of base 18 is only minimally larger in width and depth than the handle section 16A in order to receive the lower end of handle section 16A of largest cross-section in the cavity 19. Each pair of walls 40 are angled inwardly toward one another such that the base 18 is of decreasing depth on opposite sides of the central section. The base 18 is larger in width than the handle section 16A by a minimal amount needed to mount the inner ends of the wheel arms 22 in the wheel arm compartments and the rearward ends of the platform arms 46 in the platform arm compartments. The cross-piece of hand grip 20 extends longitudinally in the same direction as base 18 perpendicular to the central longitudinal axis of handle 16. Accordingly, the frame of cart 14 as defined by handle 16 and base 18 has a slender, narrow profile in depth and width. In the expanded configuration for luggage cart 14, the overall width of the luggage cart corresponds to the perpendicular distance between parallel planes along the outermost surfaces of the wheel structures, which are maximally spaced from the central longitudinal axis of handle 16 since the wheel arms 22 are perpendicular or substantially perpendicular to handle 16. The width of base 18 is considerably smaller than the overall cart width in the expanded configuration due to extension of the wheel arms 22 laterally in opposite directions beyond base 18. The height of cart 14 in the expanded configuration corresponds to the perpendicular distance between parallel planes along the bottom of the wheels 24 and the top of the hand grip 20. The cart height extends in the same direction as the handle central longitudinal axis and is perpendicular to the cart width. As will be understood more clearly from the explanation below, the overall depth of the cart 14 in the expanded configuration corresponds to the perpendicular distance between a plane coinciding with back surfaces of the wheel structures and a parallel plane coinciding with the front of the platform 26.

The slider 28 is an actuator for moving the luggage cart 14 from the collapsed configuration to the expanded configuration and from the expanded configuration to the collapsed configuration. The slider 28 has a top wall 35 and a skirt 36 defining one or more side walls depending from the top wall 35 to circumscribe the interior of the slider. The top wall 35 has an aperture therein for receiving the handle 16 extending entirely through the slider 28. The aperture in top wall 35 preferably has a configuration and size corresponding to the external cross-section of handle section 16A passing therethrough with a close fit while allowing the slider 28 to slide longitudinally along the handle section 16A. Since the configuration of the aperture in top wall 35 and the external cross-section configuration of handle section 16A are noncircular, the slider 28 and handle 16 are prevented from rotating relative to one another. It should be appreciated that the bottom and/or the skirt of the slider 28 may have openings therein as needed to pivotally mount the ends of the wheel struts 30 and platform struts 32 within the slider and/or to accommodate pivotal movement of the wheel struts 30 and platform struts 32 relative to the slider as explained further below.

An outer end portion of each wheel arm 22 is pivotally connected to a first or outer end of the corresponding wheel strut 30, the second or inner end of the wheel strut 30 being pivotally connected to the slider 28. The first ends of the wheel struts 30 may be pivotally connected to the outer end portions of the respective wheel arms 22 in various ways including pivot structures 31 such as pins, rivets or other pivot structures passing through aligned holes in the first ends of the wheel struts and in the outer end portions of the wheel arms. The pivot structures 31 define first or outer wheel strut pivot axes parallel to the wheel arm pivot axes and about which the wheel struts 30 and corresponding wheel arms 22 are pivotal or movable relative to one another. In the expanded configuration for luggage cart 14, the outer wheel strut pivot axes are maximally spaced laterally of the central longitudinal axis of handle 16 and are maximally spaced laterally of the respective wheel arm pivot axes in the direction of cart width since the wheel arms 22 are extended perpendicular or substantially perpendicular to handle 16. In the collapsed configuration for luggage cart 14, the outer wheel strut pivot axes are disposed over the respective wheel arm pivot axes in the direction of cart height and are located close to handle 16 due to the wheel arms 22 being parallel or substantially parallel to handle 16 as described further below.

The second or inner ends of the wheel struts 30 are pivotally connected to the slider 28 for pivotal movement in a plane perpendicular to the wheel arm pivot axes. The second ends of the wheel struts 30 may be pivotally connected to the slider 28 in various ways including pivot structures 33 such as pins, rivets or other pivot structures secured within or to the slider and passing through holes in the second ends of the wheel struts. The pivot structures 33 define second or inner wheel strut pivot axes parallel to the wheel arm pivot axes and about which the wheel struts 30 and slider 28 are pivotal or movable relative to one another. The wheel struts 30 are connected to the wheel arms 22 along a forward face of the wheel arms, the wheel struts 30 being flat or planar with a minimal depth to lie close to the wheel arms and maintain the minimal depth for the frame of the luggage cart 14.

The luggage support platform or carrier 26 is pivotally connected to the base 18 by the platform arms 46 which have first or forward ends rigidly secured to platform 26 and have second or rearward ends respectively pivotally mounted in the platform arm compartments 48 in base 18. In luggage cart 14, the forward ends of the platform arms 46 are secured on an upper surface 41 of platform 26, with the platform arms 46 being of minimal height to extend above the platform upper surface 41 a minimal amount. The second or rearward ends of the platform arms 46 may be pivotally mounted in the platform arm compartments 48 in various ways including pivot structures 50 such as rivets, pins or other pivot structures secured to the interior side walls and partition walls of base 18 and extending through holes in the second or rearward ends of the platform arms 46. The central longitudinal axes of pivot structures 50 are coaxial and define a platform arm pivot axis about which the platform arms 46 are pivotal relative to the base 18. The platform arm pivot axis is perpendicular to the wheel arm pivot axes and to the central longitudinal axis of handle 16. The platform arm pivot axis can be parallel or coaxial with the extension axis of wheel arms 22. The platform arms 46 are disposed inwardly of the side edges of the platform 26 so as not to protrude beyond the width of platform 26.

The platform struts 32 have first or forward ends respectively pivotally mounted to first or forward end portions of the platform arms 46 and have second or rearward ends pivotally mounted to the slider 28. The first ends of the platform struts 32 may be respectively pivotally mounted to the first end portions of the platform arms 46 in various ways including pivot structures 37 such as rivets, pins or other pivot structures passing through aligned holes in the platform struts 32 and platform arms 46. The central longitudinal axes of pivot structures 37 are coaxial to define a first or forward platform strut pivot axis parallel to the platform arm pivot axis and about which the platform struts 32 and platform arms 46 are pivotal or movable relative to one another. The second ends of the platform struts 32 may be pivotally mounted to the slider 28 in various ways including a pivot structure 51 such as a pin, rivet or other pivot structure secured within the slider and passing through holes in the second ends of the platform struts. The pivot structure 51 defines a second or rearward platform strut pivot axis about which the platform struts 32 are pivotal relative to the slider 28 in parallel planes perpendicular to the forward and rearward platform strut pivot axes. The rearward platform strut pivot axis is parallel to the platform arm pivot axis and to the forward platform strut pivot axis. The platform struts 32 are preferably planar and mounted in parallel relation along respective planar inner side surfaces of the platform arms 46.

Figure 8:
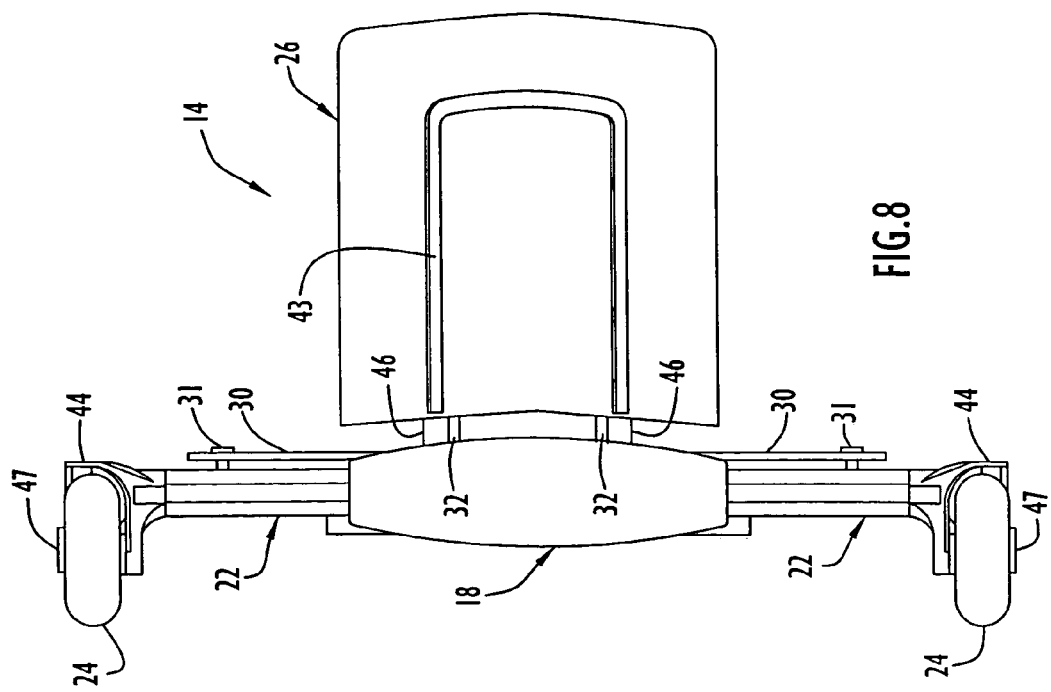
FIG. 8 is a bottom view of the collapsible wheeled luggage cart of FIG. 4.

The upper surface 41 of platform 26 is planar and may be defined by the top surface of a planar plate of uniform thickness comprising the platform 26. The plate may have a generally rectangular peripheral configuration with the width thereof extending in the width direction of the luggage cart 14 and the length thereof extending in the depth direction of the luggage cart 14 when the cart is in the expanded configuration. Preferably, the width of the plate 41 is the same as or substantially the same as the width of base 18. The back edge of the plate may have a configuration complementary to the configuration of the front surface of base 18 such that a space, which is of small substantially uniform size, is defined between the back edge of the platform and the front surface of base 18 in the expanded configuration. The front corners of the plate are preferably rounded or beveled to present blunt edges which will avoid damage to objects or surfaces impacted by platform 26. The lower surface of platform 26 includes an abutment 43 or rest surface for contacting the transport surface 60, such as the ground, floor or other transport surface, to support the luggage cart 14 thereon in a stationary upright or vertical orientation when in the expanded configuration as shown in FIG. 7. The abutment 43 may be formed in various ways including a strip of material depending from a bottom surface of the plate. As shown in FIG. 8, the strip of material forming abutment 43 may follow a path corresponding to the peripheral configuration of the plate but spaced inwardly of the perimeter of the plate with ends of the strip of material terminating at or near the back edge of the plate. It should be appreciated that the plate defining the upper surface 41 and the strip of material defining the abutment 43 may constitute separate components attached to one another in any suitable way and that alternatively the platform 26 including upper surface 41 and abutment 43 may be formed integrally, unitarily or monolithically as a single component. The abutment 43 may be made of a frictional or other material to resist sliding movement when in contact with the transport surface 60.

Figure 4:
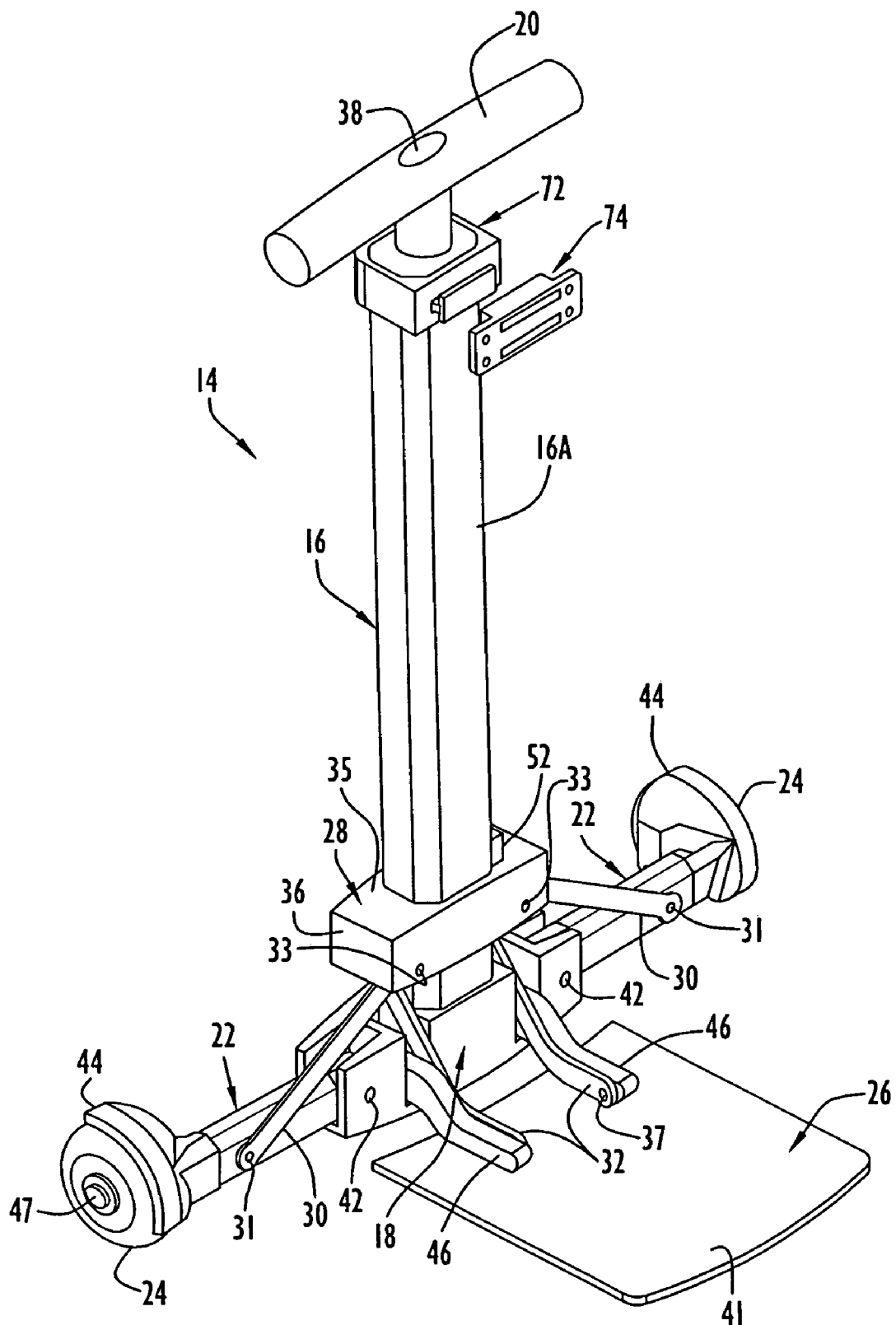
FIG. 4 is an assembled front perspective view of the collapsible wheeled luggage cart of FIG. 3 illustrating the luggage cart in an open or expanded configuration but with the handle of the luggage cart in a retracted handle position.

The locking and releasing mechanism 34 includes a locking mechanism for locking the luggage cart 14 in the expanded and collapsed configurations and a release mechanism for releasing the locking mechanism to permit movement of the luggage cart 14 from one configuration to the other. The release mechanism 52 is depicted as a push button associated with a button cover 54 along the top wall of slider 28. The release mechanism 52 normally protrudes or is elevated from the top wall of the slider. The release mechanism 52 is operatively associated with the locking mechanism, which includes a locking member 56 and a locking spring 58 carried within slider 28. The locking member 56 is depicted as a plunger mounted within the slider 28 exteriorly of and alongside the handle section 16A. The locking member 56 is mounted for movement along a locking axis perpendicular to the central longitudinal axis of handle 16, and the locking spring 58 biases the locking member toward the handle 16 along the locking axis. When luggage cart 14 is in the expanded configuration and the release mechanism 52 is not actuated to release the locking mechanism, the slider 28 is in a lower longitudinal position along handle 16 and spring 58 biases the locking member 56 along the locking axis toward and into locking engagement with handle 16 to prevent longitudinal movement of the slider along the handle. Locking engagement of the locking member 56 with handle 16 is accomplished due to a detent 57 on the plunger being lockingly engaged or received in an appropriately located lower opening or notch in the wall of handle section 16A when the slider 28 is in the lower longitudinal position. The release mechanism 52 is maintained in an elevated or unactivated position by the locking member 56 being disposed beneath the release mechanism in the path of movement of the release mechanism in a downward direction parallel to the central longitudinal axis of handle 16. Since the slider 28 is prevented from moving along the handle 16, the luggage cart 14 is locked in the expanded configuration and remains locked in the expanded configuration until the release mechanism 52 is activated or manually depressed by a user, causing movement of locking member 56 out of locking engagement with handle 16 against the bias of spring 58 such that longitudinal movement of the slider 28 along the handle 16 from the lower longitudinal position to an upper longitudinal position is permitted. The locking member 56 is moved out of locking engagement or reception in the opening or notch in handle 16 by virtue of structure on the release mechanism 52 displacing the locking member 56 to move away from handle section 16A along the locking axis. As seen in FIG. 4, the slider 28 in the lower longitudinal position is located at or near the lower end of the frame near the lower end of handle 16 and near base 18 when the luggage cart 14 is in the expanded configuration, and the slider 28 is moved upwardly along handle 16 away from base 18 to the upper longitudinal position when the luggage cart is placed in the collapsed configuration depicted in FIGS. 11 and 12. When the luggage cart 14 has been placed in the collapsed configuration from the expanded configuration, the locking member 56 acted on by spring 58 reengages the handle 16 in locking engagement, thereby locking the slider 28 in the upper longitudinal position. In particular, the detent 57 of locking member 56 is lockingly engaged or received in an appropriately located upper opening or notch in the wall of handle section 16A when the slider 28 is in the upper longitudinal position. As soon as the slider 28 has reached the upper longitudinal position, the detent 57 is in alignment with the upper opening or notch in the handle section 16A, and the spring 58 acting on the locking member causes the detent to automatically lockingly engage the upper opening or notch. The release mechanism 52 is again placed and maintained in its elevated position due to the locking member 56 being disposed beneath the release mechanism 52.

The luggage cart 14 is placed in the expanded configuration from the collapsed configuration by the user pressing on the release mechanism 52 to displace the locking member 56 from locking engagement with the upper opening or notch in handle section 16A and moving the thusly unlocked slider 28 downwardly along the handle to the lower longitudinal position. The release mechanism 52 can be depressed manually by the user with one hand, the same hand being used to move the slider 28 along handle 16 from the upper longitudinal position to the lower longitudinal position. As the slider 28 is moved downwardly along handle 16 from the upper longitudinal position to the lower longitudinal position, the inner ends of wheel struts 30 and the rearward ends of platform struts 32 are pushed downwardly with the slider 28. As a result, the wheel struts 30 pivot relative to the slider 28 in unison and in opposition to one another about the inner wheel strut pivot axes in the lateral direction away from base 18. At the same time, the platform struts 32 pivot relative to the slider 28 in unison about the rearward platform strut pivot axis in the forward direction away from base 18. Due to the wheel struts 30 pivoting about the inner wheel strut pivot axes, the outer ends of the wheel struts 30 are moved downwardly and laterally outwardly away from the handle 16. The wheel arms 22 are carried by the wheel struts 30 and pivot in unison and in opposition to one another about the wheel arm pivot axes such that the outer ends of the wheel arms 22 are moved downwardly and laterally outwardly away from handle 16 due to relative pivotal movement between the wheel arms 22 and wheel struts 30 at the outer wheel strut pivot axes. Concurrently therewith, pivotal movement of the platform struts 32 relative to the slider 28 about the rearward platform strut pivot axis causes the forward end portions of the platform arms 46 to be moved downwardly and forwardly away from the handle 16 due to the platform struts 32 and platform arms 46 pivoting relative to one another at the forward platform strut pivot axis. As the forward end portions of the platform arms 46 are pushed downwardly and forwardly outwardly away from the handle 16, the platform arms 46 are caused to pivot downwardly and forwardly outwardly about the platform pivot axis at the rearward ends of the platform arms 46. The platform 26 is thereby pivoted downwardly and forwardly outwardly away from the handle 16. Once the slider 28 has reached the lower longitudinal position, the detent 57 is in alignment with the lower opening or notch in handle section 16A and the spring 58 acting on locking member 56 causes the detent to automatically lockingly engage the lower opening or notch in the handle section 16A.

When the luggage cart 14 is in the expanded configuration, the slider 28 is at the lower longitudinal position along handle 16 and the platform 26 is in a deployed position extending perpendicular or substantially perpendicular to handle 16 in the direction of cart depth. The wheel arms 22 are in a deployed position extending perpendicular or substantially perpendicular to handle 16 in opposite lateral directions in the direction of cart width. The wheels 24 are in their deployed position maximally spaced laterally from the central longitudinal axis of handle 16 and rotatable in parallel or substantially planes perpendicular or substantially perpendicular to the transport surface 60. The wheel struts 30 extend downwardly and angularly outwardly in opposite lateral directions from the slider 28 in the direction of cart width. The platform arms 46 extend forwardly from the base 18 in the direction of cart depth. The platform struts 32 extend downwardly and angularly outwardly from the slider 28 in the forward direction in the direction of cart depth. The luggage cart 14 is of maximum overall width and overall depth in the expanded configuration and is of maximum overall height in the fully expanded configuration when the handle 16 is moved to the fully extended position or is of less than the maximum overall height in a partially expanded configuration when the handle is fully retracted or extended less than its maximum extension distance. The luggage cart 14 in the expanded configuration may be supported in an upright vertical orientation on the transport surface 60 as shown in FIG. 7 with the handle 16 extending vertically perpendicular to the transport surface and the platform 26 extending horizontally. When thusly supported in the upright vertical orientation, the wheels 24 are in contact with the transport surface 60 but the luggage cart 14 is maintained stationary in the upright vertical orientation due to contact of the abutment 43 with the transport surface. The handle 16 is shown in FIG. 7 in the retracted handle position and is moved to the appropriate extended handle position as represented in FIG. 10 when the luggage cart is to be used to transport an object such as a carrying case 12 placed on the upper surface of platform 26. With the handle 16 in the appropriate extended handle position, the hand grip 20 will be at the appropriate height for being comfortably grasped by the hand of a user to push or pull the luggage cart 14 along the transport surface 60 as permitted due to rolling contact between the transport surface and wheels 24. In order to push or pull the luggage cart 14 along the transport surface 60, the hand grip 20 is manipulated to tilt the luggage cart rearwardly from its upright vertical orientation onto wheels 24 so that the platform 26 is not in contact with the transport surface 60 as depicted by dotted lines in FIG. 7. The wheels 24 are rotatable on and along the transport surface 60 in vertical planes perpendicular or substantially perpendicular to the transport surface. The carrying case 12 or other object on the platform 26 may rest against and be supported by the handle 16 when the luggage cart 14 is tilted rearwardly onto its wheels 24. Another object may be stacked on top of the carrying case 12 that is supported on platform 26, and the other object may rest against and be supported by the handle 16 especially when the luggage cart 14 is tilted rearwardly onto its wheels from the vertical upright orientation. The platform struts 32 and platform arms 46 are configured and/or arranged to minimize interference with the object or objects carried on the platform 26 and to allow the carrying case or other object to be placed as close as possible to handle 16 and base 18. The platform arms 46 lie close to the upper surface 41 of platform 26 so that the carrying case or other object placed on the upper surface of the platform can rest on top of the platform arms. By virtue of the configuration and arrangement for the platform struts 32 and platform arms 46, the carrying case or object on the platform 26 is cradled between base 18 and handle 16.

In order to place the luggage cart 14 in the collapsed configuration from the expanded configuration, the release mechanism 52 is depressed by the user to disengage the locking member 56 from handle 16 so that the slider 28 can be moved longitudinally along the handle 16. The release mechanism 52 can be depressed manually by the user using one hand, which is also used to manually move the slider 28 along handle 16 from the lower longitudinal position to the upper longitudinal position. As the slider 28 is moved upwardly along handle 16 from the lower longitudinal position to the upper longitudinal position to place the luggage cart 14 in the collapsed configuration from the expanded configuration, the inner ends of wheel struts 30 and the rearward ends of platform struts 32 are pulled upwardly with the slider 28. Consequently, the wheel struts 30 pivot relative to the slider 28 in unison and in opposition to one another downwardly and laterally inwardly about the inner wheel strut pivot axes. At the same time, the platform struts 32 pivot relative to the slider 28 in unison about the rearward platform strut pivot axis downwardly and rearwardly inwardly. As a result of the wheel struts 30 pivoting about the inner wheel strut pivot axes, the outer ends of the wheel struts 30 are moved upwardly and laterally inwardly closer to the handle 16. The wheel arms 22 are carried by the wheel struts 30 and pivot about the wheel arm pivot axes. The wheel arms 22 pivot in unison and in opposition to one another about the wheel arm pivot axes such that the outer ends of the wheel arm 22 are moved upwardly and laterally inwardly toward handle 16 due to relative pivotal movement between the wheel arms 22 and wheel struts 30 at the outer wheel strut pivot axes. At the same time, pivotal movement of the platform struts 32 relative to the slider 28 about the rearward platform strut pivot axis causes the forward end portions of the platform arms 46 to be moved upwardly and rearwardly inwardly closer to handle 16 as permitted by relative pivotal movement between the platform struts 32 and platform arms 46 at the forward platform strut pivot axis. As the forward end portions of the platform arms 46 are pulled upwardly and rearwardly inwardly toward the handle 16, the platform arms 46 are caused to pivot upwardly and rearwardly inwardly about the platform pivot axis at the rearward ends of the platform arms 46. The platform 26 is thusly pivoted upwardly and rearwardly inwardly toward the handle 16.

When the slider 28 is in the upper longitudinal position along handle 16 corresponding to the collapsed configuration for the luggage cart 14, the spring 58 causes the locking member 56 to automatically engage with the upper notch in handle section 16A to prevent longitudinal movement of the slider 28 along the handle 16 and thereby lock the luggage cart 14 in the collapsed configuration. The wheel arms 22 will have rotated from their deployed position to a non-deployed or withdrawn position in which the wheel arms 22 are close to handle 16 with the wheel arm longitudinal axes parallel or substantially parallel to the central longitudinal axis of handle 16. The wheel arms 22 now extend perpendicular to the wheel arm pivot axes in the direction of the height of the luggage cart 14. The wheel arms 22 extend through the openings of the wheel arm compartments along the top of base 18 on opposite sides of handle 16 and are disposed within the width dimension of base 18 as shown in FIG. 11. As a result of the wheel arms 22 being moved to their non-deployed position, the wheels 24 are moved to a non-deployed position close to handle 16 and are oriented transverse to the central longitudinal axis of handle 16. As shown in FIG. 11, the wheels 24 in their deployed position may extend a minimal or insignificant distance beyond the width of base 18 and, as shown in FIG. 12, the wheels 24 in their deployed position may extend a minimal or insignificant distance beyond the depth of base 18. The platform 26 will be in a non-deployed position close to handle 16 and extending in the same direction as handle 16 along the height of the luggage cart. As shown in FIG. 12, the platform 26 may be parallel or substantially parallel to the central longitudinal axis of handle 16 when the platform is in its non-deployed position. The platform 26 also extends parallel or substantially parallel to central longitudinal axis of the wheel arms 22, the wheel arms 22 being contained within the width of the platform 26 and base 18. The wheel struts 30 are disposed between the handle 16 and the upper surface 41 of platform 26 and lie in a plane parallel or substantially parallel to the platform. The arrangement, configuration and minimal thickness of the wheel struts 30 allows the platform 26 to lie very close to the front of handle 16 and base 18 and, as shown in FIG. 12, the upper surface 41 of the platform 26 may contact the front wall of base 18. The platform struts 32 lie close to handle 16 in planes parallel or substantially parallel to the central longitudinal axes of wheel arms 22, with the platform arms 46 extending from the openings in the platform arm compartments along the top of base 18 to be disposed alongside the platform struts 32 on opposite sides of handle 16. The arrangement, configuration and size of the platform struts 32 and platform arms 46 allows the platform struts and platform arms to fit between the wheel arms 22 and the handle 16.

Placement of the luggage cart 14 in the collapsed configuration from the expanded configuration thusly results in the wheel arms 22 being moved in unison from a position extending in the direction of cart width to a position extending in the direction of cart height. At the same time, the platform 26 is moved from a position extending in the direction of cart depth to a position extending in the direction of cart height. In particular, the wheel arms 22 are moved from a position perpendicular or substantially perpendicular to the handle 16 in the direction of cart width to a position parallel or substantially parallel to the handle in the direction of cart height. The platform 26 is moved from a position perpendicular or substantially perpendicular to handle 16 in the direction of cart depth to a position parallel or substantially parallel to the handle in the direction of cart height. Accordingly, both the overall width and overall depth of the luggage cart 14 are decreased when the cart is placed in the collapsed configuration from the expanded configuration, and the overall height of the luggage cart 14 may also be decreased by moving the handle 16 from an extended handle position to the retracted handle position. The luggage cart 14 is of minimum overall width and overall depth in the collapsed configuration and is of minimum overall height in the fully collapsed configuration in which the handle 16 is fully retracted or is of greater than minimum overall height in a partially collapsed configuration in which the handle is fully or partially extended. With the handle 16 fully retracted in the collapsed configuration, the luggage cart 14 is in a collapsed inoperative configuration and presents a compact configuration and size of minimal overall height, depth and width for being easily transported and stored in small size spaces such as the space beneath an airplane passenger seat or the interior of the carrying case. When the luggage cart 14 is placed in the expanded configuration from the collapsed configuration in response to movement of slider 28 along handle 16 from the upper longitudinal position to the lower longitudinal position when the slider 28 is released from the handle 16 by depressing the release mechanism 52, the wheel arms 22 and wheels 24 are returned in unison to their deployed position and the platform 26 is returned at the same time to its deployed position, thereby increasing the overall depth and width for the luggage cart 14. When the handle 16 is maximally extended with the cart 14 in the expanded configuration, the cart 14 is of maximum height and is in an expanded operative configuration ready to be used to transport a carrying case by rolling along a transport surface. The collapsible wheeled cart 14 can be used to carry and transport any type of carrying case or luggage.

Only one manual operative motion, i.e. longitudinal or linear movement of slider 28 downwardly along handle 16, is required of a user to place the luggage cart 14 in the expanded configuration from the collapsed configuration and the same linear movement of the slider 28, but in the reverse or upward direction along the handle 16, is all that is required to place the luggage cart 14 in the collapsed configuration from the expanded configuration. The hand of the user used to grasp the slider 28 for longitudinal movement thereof is also used to depress the release mechanism 52 to release the slider. Since depressing the release mechanism 52 is essentially simultaneous with initiating the slider longitudinal movement, it is part of the single manual operative motion. The operative motion involved in releasing the slider 28 and moving it along the handle 16 is easy, simple, continuous, involves little physical effort, and is performed using only one hand. The single operative motion effectuates both the increase in depth and the increase in width of the luggage cart 14 when placed in the expanded configuration, such that separate, different, multi-step or sequential independent and distinct operative motions are not required in order to achieve the increased depth and width, and the same operative motion applied in the opposite or reverse direction effectuates both the decrease in width and depth when the cart is placed in the collapsed configuration.

It should be appreciated that various mechanisms including various types of frame components, springs and/or spring materials can be incorporated in the luggage cart 14 to normally bias the luggage cart to assume the expanded configuration. As one example, the slider 28 can be spring biased to the lower longitudinal position; however, other components of the luggage cart could alternatively or additionally be spring biased so that the cart normally is in the expanded configuration. The luggage cart 14 may thusly be effected to move automatically from the collapsed configuration to the expanded configuration merely in response to operation of the release mechanism 52 to release the slider 28 for movement along handle 16, whereupon the spring bias causes the slider 28 to move along handle 16 from the upper longitudinal position to the lower longitudinal position at which the locking member 56 automatically engages the handle 16 to lock the slider 28 in place. The spring bias could, for example, be a rotational bias applied to the inner ends of the wheel struts 30 and/or the rearward ends of the platform struts 32 or a linear bias applied to the slider 28. Where the luggage cart 14 is biased to assume the expanded configuration, the user need only operate or press the release mechanism 52 with a finger of one hand, again a single manual operative motion, so that the luggage cart 14 is moved to the expanded configuration automatically. Thereafter, placement of the luggage cart 14 in the collapsed configuration from the expanded configuration would be carried out as described above.

The carrying case 12 comprises a plurality of external walls enclosing an interior. The external walls of the carry case 12 may include a front wall, a back wall, a top wall, a bottom wall, and opposing side walls. In the convertible carrying case system 10, the carrying case 12 is a non-rolling carrying case having an external pocket 64 along a back of the carrying case, the pocket 64 being formed between a back wall 66 of the carrying case and a back panel 68 overlying the back wall as shown in FIGS. 1 and 2. The pocket 64 is open at its top and has a zippered closure 70 at or near its bottom adjacent or near the bottom wall of the carrying case. The closure 70 may be selectively opened to present an access opening into pocket 64 centrally located between the side walls of the carrying case 12. When the luggage cart 14 is in the expanded configuration, preferably with handle 16 fully retracted, the hand grip 20 of handle 16 can be inserted through the access opening and the handle 16 moved upwardly through the pocket 64 until the bottom wall of carrying case 12 rests on platform 26 with the upper end of handle 16 protruding from the top of pocket 64 such that hand grip 20 is exposed for grasping even when the handle 16 is in the fully retracted handle position. The width of the luggage cart 14 in the expanded configuration, as defined by the distance between the planes of the outer surfaces of the wheel structures, can be selected in accordance with the width of the carrying case 12 so that the wheels 24 are located at or near the side walls of the carrying case 12 when the carrying case is supported on the platform 26 with the handle 16 in the pocket 64. Preferably, the width of the luggage cart 14 in the expanded configuration results in placement of the wheels 24 adjacent the bottom rear side corners of the carrying case 12 as shown in FIG. 1. By selecting the width of the luggage cart 14 in the expanded configuration to correspond to the width of the carrying case 12, the wheels 24 are positioned relative to the carrying case in a manner similar to the attached wheels of standard rolling carrying cases. As shown in FIG. 1, the wheels 24 are optimally located at the bottom rear side corners of the carrying case 12 without extending or protruding beyond the width of the carrying case 12. The height of the handle 16 in the fully retracted position may also be selected so that the hand grip 20 is located at or near the top wall of the carrying case 12 supported on platform 26 as shown in FIGS. 1 and 2. The depth of the luggage cart 14 in the expanded configuration is such that the platform 26 preferably does not protrude beyond the front wall of the carrying case 12 when the back wall 66 of the carrying case is in abutment with the handle 16 as seen in FIG. 2. Accordingly, the luggage cart 14 with the carrying case 12 supported thereon creates a visual impression of structural unity and integration similar to rolling carrying cases in that the carrying case 12 and the luggage cart 14 have the appearance of being structurally unified with the extendable and retractable handle 16 and the wheels 24 appearing to be built-in components of the carrying case 12. Although the appearance of structural unity and integration provides aesthetic advantages, it should be appreciated that the luggage cart 14 can be used to transport various sizes and configurations of carrying cases and other objects including carrying cases and other objects having height, width and depth dimensions considerably different from the height, width and depth of the luggage cart in the expanded configuration. In addition, it should be appreciated that the luggage cart 14 can transport various carrying cases without the handle 16 being received in a pocket of the carrying case. Carrying cases or other objects transported using luggage cart 14 can merely be supported on platform 26 and can rest against the handle 16 when the luggage cart is tilted rearwardly from its vertical upright orientation. However, having the handle 16 received in a pocket of the carrying case provides a structural attachment between the luggage cart 14 and the carrying case 12 facilitating use of the hand grip 20 to manually lift and/or carry the carrying case 12 in a manner similar to a non-rolling carrying case while the luggage cart 14 remains attached to the carrying case 12. Of course, it should be appreciated that the carrying case 12 can be provided with a fixed handle 71 for manually lifting and/or carrying the carrying case 12.

Figure 13:
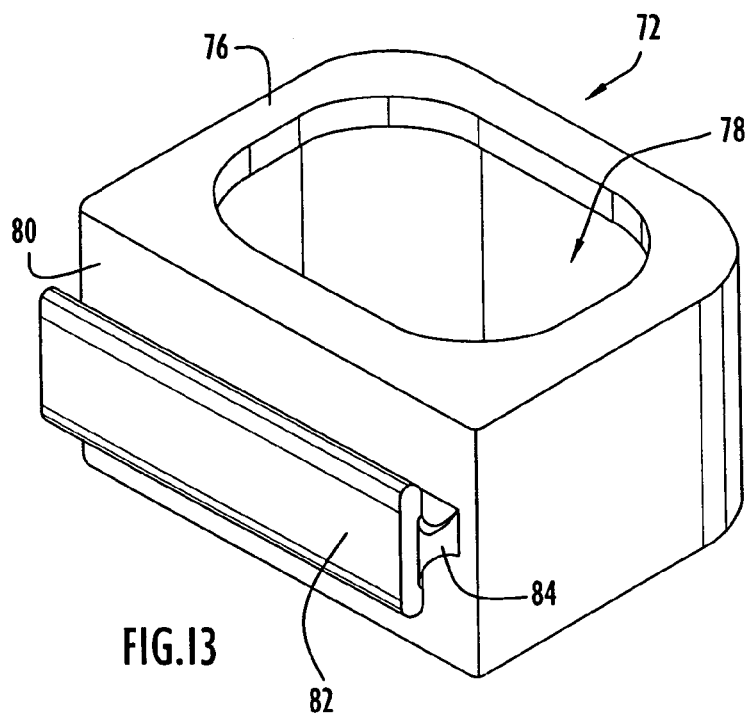
FIG. 13 is a front perspective view of a connector element for the luggage cart of the convertible carrying case system.
Figure 14:
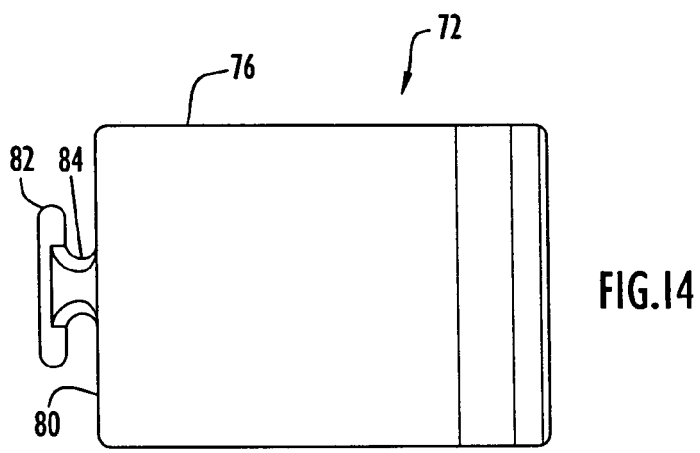
FIG. 14 is a side view of the connector element of FIG. 13.
Figure 15:
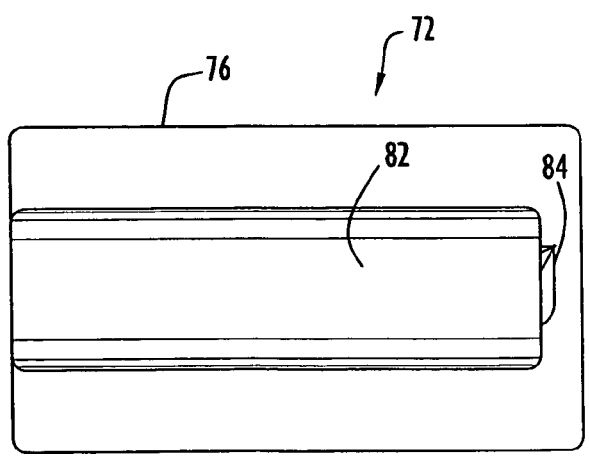
FIG. 15 is a front view of the connector element of FIG. 13.

In the convertible carrying case system 10, the luggage cart 14 is also removably attachable to carrying case 12 via releasable engagement of a connector element 72 on the luggage cart 14 with a complementary connector element 74 on the back wall 66 of the carrying case 12. Connector elements 72 and/or 74 are seen in FIGS. 1-7 and 10-18 but are best seen in FIGS. 13-18. FIGS. 13-15 illustrate a preferred connector element 72 for being secured on luggage cart 14 and FIGS. 16-18 illustrate a preferred complementary connector element 74 for being secured on the carrying case 12 of the convertible carrying case system 10. Connector element 72 comprises a connector body including a collar 76 circumscribing a cavity 78 therethrough having a cross-sectional size and configuration to receive the handle section 16A coaxially therethrough with a mating fit. The collar 76 is secured to handle section 16A at an appropriate location along the height of handle section 16A to engage with the complementary connector element 74 on carrying case 12. The collar 76 has a planar exterior face 80 and a planar male detent or locking member 82 mounted on the planar exterior face 80 in parallel spaced relation therewith by a narrower connecting web 84. The male detent 82 extends along the width of collar 76 in a direction perpendicular to a central longitudinal axis of cavity 78 coaxial with the central longitudinal axis of handle 16. One side edge of the detent 82 terminates at the corresponding side edge of exterior face 80 while the opposite side edge of detent 82 terminates inwardly of the corresponding opposite side edge of exterior face 80 as shown in FIG. 15, the detent side edges being parallel to the exterior face side edges. The male detent 82 may have a rectangular peripheral configuration on an exterior face 80 having a rectangular peripheral configuration larger than the detent 82. The collar 76 is oriented on the handle section 16A such that exterior face 80 and detent 82 face the front of the luggage cart 14. The exterior size of collar 76 is preferably minimized so as not to add appreciably to the width and depth of the handle 16.

The complementary connector element 74 includes a connector body 86 which may be provided with mounting holes 88 for receiving fasteners such as rivets (not shown) used to secure the connector body 86 on the back wall 66 of carrying case 12 centrally between the opposing side walls of the carrying case 12. Connector body 86 can have a rectangular peripheral configuration with mounting holes 88 at its four corners for securing the connector body 86 on the back wall 66 of carrying case 12, with a planar back surface 89 of the connector body in contact with the back wall 66. The connector body 86 has a raised section opposite the back surface 89 and containing a female slot or cavity 90 therein for receiving the male detent 82 in mating relation. The slot 90 has a closed side at one side of the raised section and has an open side 92 on the opposite side of the raised section. The body 86 has a front opening extending from the open side to the closed side of slot 90 and providing communication with the slot 90. The open side of slot 90 provides access for the detent 82 to be slid into and out of the slot 90 in mating engagement therewith, with the web 84 extending through the front opening. The connector body 86 has a resilient or deflectable finger 94 forming a back wall of the slot 90. The finger 94 has one end attached to the connector body 86 at the closed side of the slot 90 and has an opposite end unattached to the connector body, the unattached end having an elevated protruding tab 96 at, near or adjacent the open side 92 of slot 90 and just beyond the corresponding side of the raised section of body 86 to be disposed externally of the slot 90. Finger 94 is resiliently biased to extend angularly from its attached end toward the front opening of slot 90 and away from the back wall 66 in a non-deflected position for the finger so that the unattached end and protruding tab 96 are normally elevated or spaced from the back wall 66 of the carrying case 12 into an obstructing position blocking the open side 92 of slot 90 when the back surface 89 of connector body 86 is secured in contact with the back wall 66. The tab 96 is depressed toward the back wall 66 of the carrying case 12 and away from the front opening of slot 90 in order to clear the open side 92 of slot 90 for entry of the detent 82 into the slot 90 via the open side 92 when the finger is in a deflected position. When the detent 82 is received fully within the slot 90 with the connecting web 84 extending through the front opening of the slot 90, the tab 96 is released and the resilient bias urging finger 94 toward the non-deflected position away from the back wall 66 of the carrying case 12 causes the finger 94 to apply a locking force against the detent 82 which prevents removal of the detent from the slot 90 in a locking position for the finger. In addition, the tab 96 located exteriorly of slot 90 at the open side 92 thereof provides an obstruction to removal of the detent 82 from the open side 92 of slot 90. The finger 94 thusly releasably locks the detent 82 in the slot 90, with the detent 82 being released for removal from the slot 90 by depressing the tab 96 to move the finger 94 to the deflected position toward the back wall 66 of carrying case 12. The connector 72 is located on the handle 16 and the complementary connector 74 is located on the back wall 66 of carrying case 12 so that the detent 82 can mate with the slot 90 when the bottom wall of the carrying case is supported on the platform 26, and the detent 82 can be releasably engaged with and disengaged from the slot 90 while the handle 16 extends within the back pocket 64.

In the convertible carrying case system 10, the carrying case 12 is removably attached and locked to the luggage cart 14 with a reliable structural attachment provided by the connector elements 72 and 74 and, secondarily, by the handle 16 received in pocket 64. When the handle 16 is in the extended handle position, the luggage cart 14 can be pushed or pulled along the transport surface to transport the carrying case 12, which remains securely attached to the luggage cart without the need for inconvenient straps or bands. The carrying case 12 is thusly prevented from falling off the luggage cart 14 and is maintained in a stable, balanced position on the luggage cart. When the handle 16 is extended, the luggage cart 14 and attached carrying case 12 are essentially the equivalent of a rolling carrying case in function, appearance and use, the handle 16 and wheels 24 appearing to be built-in components of the carrying case 12 similar to the built-in wheels and extendable/retractable handles of standard rolling carry cases. When the handle 16 is in the fully retracted handle position with the luggage cart 14 otherwise in the expanded configuration, the attached carrying case 12 can be used without the rolling function similar to standard non-rolling carrying cases. Accordingly, the carrying case 12 can be manually lifted and carried via its handle 71 or via the hand grip 20 of the luggage cart in a manner similar to non-rolling carrying cases while the luggage cart 14 remains attached thereto. The luggage cart 14 in the expanded configuration attached to the carrying case 12 does not add any appreciable weight or bulk to the carrying case 12 and does not increase or appreciably increase the external dimensions of the carrying case 12. The carrying case 12 is easily detachable and separable from the luggage cart 14 for conversion back into a completely non-rolling carrying case without wheels or an extendible and retractable handle. When the luggage cart 14 is disassociated from the carrying case 12, the luggage cart 14 can be placed in the fully collapsed configuration for easy portability and/or storage. In the fully collapsed configuration, the luggage cart 14 is small enough to fit within the carrying case 12.

Figure 19:
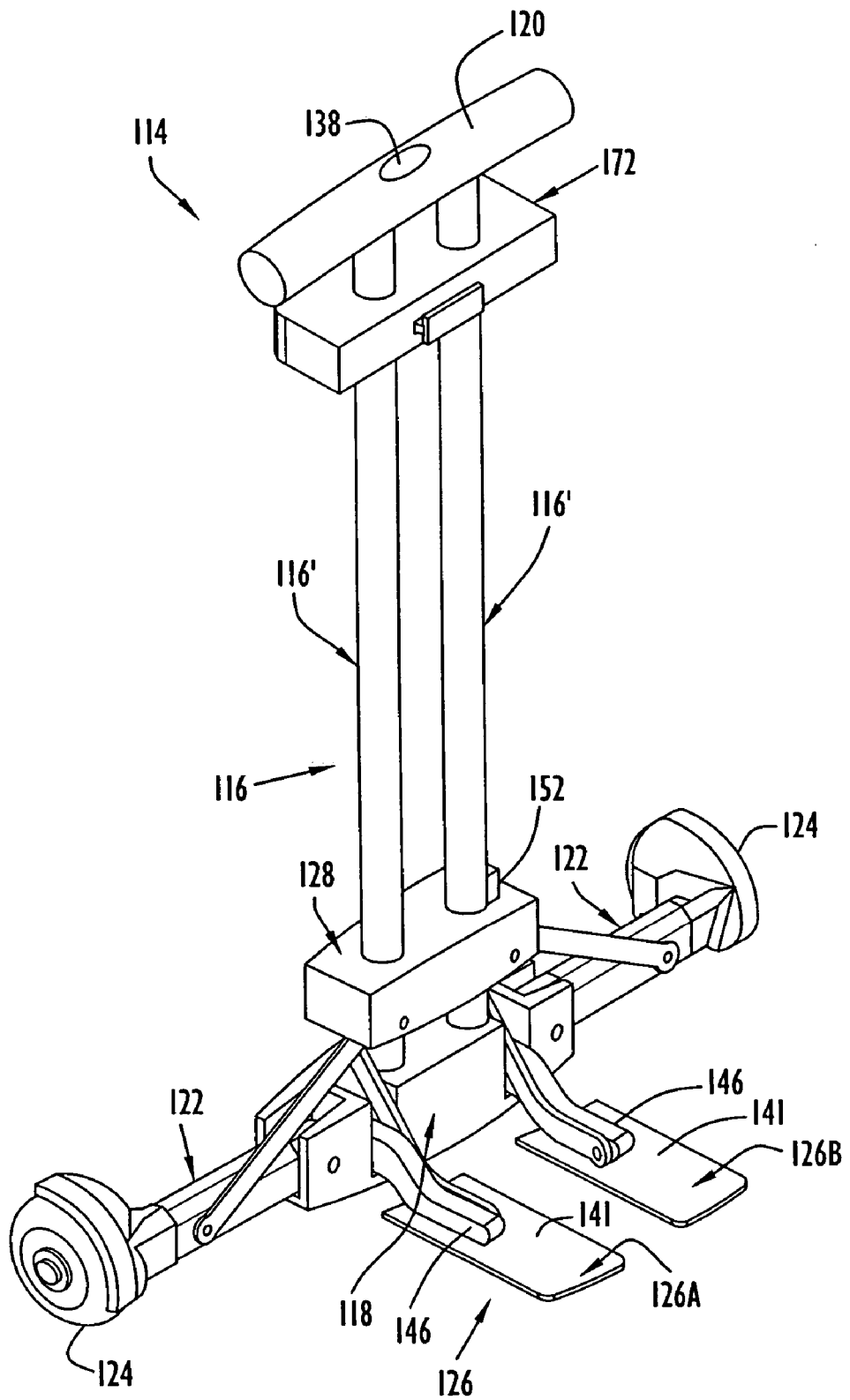
FIG. 19 is a front perspective view of an alternative collapsible wheeled luggage cart according to the present invention.

FIG. 19 is representative of a luggage cart 114 according to the present invention which is similar to luggage cart 14 but is modified to include a dual handle 116 and a dual luggage support platform 126. The handle 116 comprises two telescoping handle components 116' extending through respective apertures in slider 128 and having lower ends secured in respective cavities of base 118 and upper ends terminating at hand grip 120. Each telescoping handle component 116' is similar to handle 16, with the slider 128 being slidable longitudinally along both handle components 116' between the upper and lower longitudinal positions to obtain the expanded and collapsed configurations for the luggage cart 114 as described above for luggage cart 14. The cross-piece of hand grip 120 has two stems extending respectively into the upper ends of the uppermost handle sections of handle components 116'. The cross-piece of hand grip 120 mounts an operating member 138 used to unlock the handle components 116' for telescoping movement as explained above for handle 16. The slider 128 carries a release mechanism 152 for unlocking a locking mechanism to permit movement of the slider 128 along the handle components 116' between the upper and lower longitudinal positions to pivot the wheel arms 122, which carry wheels 124, and the platform 126 to obtain the expanded and collapsed configurations as described above for luggage cart 14. Although the slider 128 has both handle components 116' extending therethrough and slides along both handle components 116', it should be appreciated that the slider 128 can be designed to have only one of the handle components 116' extend therethrough and to slide along only the one handle component 116' between the upper and lower longitudinal positions in order to move the luggage cart to the expanded and collapsed configurations.

The luggage support platform 126 for the luggage cart 114 is similar to the luggage support platform 26 in function and operation but, while the luggage support platform 26 comprises a single continuous platform associated with platform arms 46 and platform struts 32, the platform 126 comprises two separate platform segments 126A and 126B each associated with a platform arm 146 and platform strut 132. The luggage support platform segments 126A and 126B have co-planar upper surfaces 141 and may have respective abutment surfaces (not shown) along the lower surfaces of the platform segments 126A and 126B as described for platform 26. Luggage support platform segments 126A and 126B are movable in unison between the deployed and non-deployed positions for platform 126 in response to pivotal movement of platform arms 146 by platform struts 132 as described above for platform 26. A carrying case may be supported on the upper surfaces 141 of the platform segments 126A and 126B when the platform 126 is in its deployed position. The handle 116 of luggage cart 114 can be inserted in a pocket of the carrying case and can have a connector element 172 removably engageable with a complementary connector element on the carrying case as explained above for luggage cart 14. The connector element 172 is similar to the connector element 72 except that the collar of connector element 172 has two cavities therethrough respectively receiving the handle components 116' therethrough.

FIG. 20 depicts an alternative carrying case 112 removably attachable to a luggage cart that has luggage support platform segments 126A and 126B as its luggage support platform to form an alternative convertible carrying case system according to the present invention. The bottom wall of carrying case 112 carries a pair of connector elements 174 having respective slots 190, each extending from an open side along the back of the carrying case toward the front of the carrying case. The luggage support platform segments 126A and 126B of luggage support platform 126 are respectively receivable in the slots 190 by sliding the platform segments, forward ends first, into the open sides of the slots 190 until the back wall 166 or back panel 168 of the carrying case 112 is disposed against the handle 116 of the luggage cart. The platform segments 126A and 126B and slots 190 are located so that the carrying case 112 is centered relative to the platform 126 and the handle 116 of the luggage cart when the platform segments 126A and 126B are received in the slots 190. The platform segments 126A and 126B themselves may thusly function as connector elements releasably engageable with the complementary connector elements 174 on carrying case 112. The carrying case 112 alternatively or additionally can have a connector element complementary to the connector element 172 on the handle 116 of luggage cart 114. The carrying case 112 can have a pocket 164 defined between back wall 166 and back panel 168 to receive the handle 116 of the luggage cart 114.

Inasmuch as the present invention is subject to many variations, modifications and changes in detail, it is intended that the subject matter described above be considered illustrative and not be taken in a limiting sense.

What is claimed is:

1. A collapsible wheeled cart for transporting a carrying case, comprising
    a handle extending longitudinally in a direction corresponding to a height of said cart and having a lower end, an upper end and a hand grip at said upper end, said handle being selectively extendable and retractable longitudinally;
    a support platform pivotally connected to said lower end of said handle for pivotal movement in a direction corresponding to a depth of said cart from a non-deployed position wherein said platform extends along said height of said cart to a developed position wherein said platform extends along said depth of said cart to support a carrying case thereon;
    a pair of wheel arms each having an outer end carrying a wheel and an inner end pivotally connected to said lower end of said handle for pivotal movement in a direction corresponding to a width of said cart from a non-deployed position wherein said wheel arms extend along said height of said cart to a deployed position wherein said wheel arms extend in opposite directions along said width of said cart to deploy said wheels for rolling movement along a transport surface;
    an actuator pivotally connected to said platform and to said wheel arms movable longitudinally along said handle from an upper longitudinal position to a lower longitudinal position to pivot said platform and said wheel arms in unison from said non-deployed positions to said deployed positions;
    a pair of platform arms pivotally connecting said platform to said lower end of said handle, said platform arms having rearward ends pivotally connected to said lower end of said handle on opposite sides of a central longitudinal axis of said handle and having forward ends secured to said platform;
    a pair of platform struts pivotally connecting said actuator to said platform, said platform struts having rearward ends pivotally connected to said actuator and forward ends respectively pivotally connected to said forward ends of said platform arms; and
    a pair of wheel struts respectively pivotally connecting said wheel arms to said actuator and having outer ends respectively pivotally connected to outer end portions of said wheel arms and inner ends pivotally connected to said actuator.

2. The collapsible wheeled cart recited in claim 1 and further including a locking and releasing mechanism for locking said actuator in said upper and lower longitudinal positions and releasing said actuator for longitudinal movement along said handle.

3. The collapsible wheeled cart recited in claim 2 wherein said locking mechanism includes a locking member automatically engageable with said handle in locking engagement when said actuator is in said upper longitudinal position and said lower longitudinal position.

4. The collapsible wheeled cart recited in claim 3 wherein said releasing mechanism includes a push button on said actuator depressible to move said locking member out of locking engagement with said handle.

5. The collapsible wheeled cart recited in claim 4 wherein said locking mechanism further includes a spring biasing said locking member into locking engagement with said handle when said actuator is in said upper longitudinal position and said lower longitudinal position.

6. A collapsible wheeled cart for transporting a carrying case, comprising
    a handle having a lower end, an upper end, a central longitudinal axis, and a hand grip at said upper end, said handle being selectively extendable and retractable along said central longitudinal axis, said handle comprising a base at said lower end and a plurality of telescoping handle sections including a lowermost handle section having a bottom end secured to said base;
    a support platform pivotally mounted to said lower end of said handle for pivotal movement about a platform pivot axis perpendicular to said central longitudinal axis of said handle, said platform having a non-deployed position wherein said platform is pivoted about said platform pivot axis upwardly toward said handle to be disposed parallel or substantially parallel to the central longitudinal axis and having a deployed position wherein said platform is pivoted about said platform pivot axis downwardly away from said handle to extend in a direction perpendicular or substantially perpendicular to said central longitudinal axis to support a carrying case thereon;

a pair of wheel arms each having an outer end carrying a wheel and having an inner ends, said inner end being pivotally mounted to said lower end of said handle on opposite sides of said central longitudinal axis for pivotal movement about respective wheel arm pivot axes perpendicular to said platform pivot axis and to said central longitudinal axis of said handle, said wheel arms having a non-deployed position wherein said wheel arms are pivoted about said respective wheel arm pivot axes upwardly toward said handle to be disposed parallel or substantially parallel to said central longitudinal axis and having a deployed position wherein said wheel arms are pivoted in opposition about said respective wheel arm pivot axes downwardly away from said handle in a direction perpendicular or substantially perpendicular to said central longitudinal axis and to said direction that said platform extends in said deployed position for said platform to deploy said wheels for rolling movement along a transport surface;

a movable actuator operatively connected with said platform and said wheel arms for being moved by a user applying a single manual operative motion to said actuator to pivot said platform and said wheel arms in unison from said non-deployed positions to said deployed positions, said actuator being a linearly movable actuator moved by a user applying linear motion to said actuator and said actuator is being mounted for linear movement along said handle;

a pair of platform arms having rearward ends pivotally connected to said base at said platform pivot axis and forward ends secured to said platform;

a pair of platform struts pivotally connecting said platform to said actuator, said platform struts having rearward ends pivotally connected to said actuator at a rearward platform strut pivot axis parallel to said platform pivot axis and having forward ends respectively pivotally connected to said forward ends of said platform arms at a forward platform strut pivot axis parallel to said platform pivot axis; and a pair of wheel struts respectively pivotally connecting said wheel arms to said actuator, said wheel struts having outer ends respectively pivotally connected to outer end portions of said wheel arms at respective outer wheel strut pivot axes parallel to said wheel arm pivot axes and having inner ends respectively pivotally connected to said actuator at respective inner wheel strut pivot axes parallel to said wheel arm pivot axes.

7. The collapsible wheeled cart recited in claim 6 wherein said wheel arms are coaxially aligned along a wheel arm extension axis in said deployed position for said wheel arms, said wheel arm extension axis being perpendicular to said central longitudinal axis of said handle and to said wheel arm pivot axes, said wheels being respectively mounted for rotation about rotation axes perpendicular to said central longitudinal axis of said handle and to said wheel arm pivot axes.

8. A collapsible wheeled cart for transporting a carrying case, comprising a handle having a lower end, an upper end, a central longitudinal axis, and a hand grip at said upper end, said handle being selectively extendable and retractable along said central longitudinal axis, said central longitudinal axis of said handle extending in a direction corresponding to a height of said cart, said direction that said platform extends in said deployed position for said platform corresponds to a depth of said cart perpendicular to said height, and said direction that said wheel arms extend in said deployed position for said wheel arms corresponds to a width of said cart perpendicular to said height and said depth;

a support platform pivotally mounted to said lower end of said handle for pivotal movement about a platform pivot axis perpendicular to said central longitudinal axis of said handle, said platform having a non-deployed position wherein said platform is pivoted about said platform pivot axis upwardly toward said handle to be disposed parallel or substantially parallel to the central longitudinal axis and having a deployed position wherein said platform is pivoted about said platform pivot axis downwardly away from said handle to extend in a direction perpendicular or substantially perpendicular to said central longitudinal axis to support a carrying case thereon;

a pair of wheel arms each having an outer end carrying a wheel and having an inner ends, said inner end being pivotally mounted to said lower end of said handle on opposite sides of said central longitudinal axis for pivotal movement about respective wheel arm pivot axes perpendicular to said platform pivot axis and to said central longitudinal axis of said handle, said wheel arms having a non-deployed position wherein said wheel arms are pivoted about said respective wheel arm pivot axes upwardly toward said handle to be disposed parallel or substantially parallel to said central longitudinal axis and having a deployed position wherein said wheel arms are pivoted in opposition about said respective wheel arm pivot axes downwardly away from said handle in a direction perpendicular or substantially perpendicular to said central longitudinal axis and to said direction that said platform extends in said deployed position for said platform to deploy said wheels for rolling movement along a transport surface; and a movable actuator operatively connected with said platform and said wheel arms for being moved by a user applying a single manual operative motion to said actuator to pivot said platform and said wheel arms in unison from said non-deployed position to said deployed positions.

* * * * *